United States Patent
Russell

(10) Patent No.: US 9,309,979 B2
(45) Date of Patent: Apr. 12, 2016

(54) SELF PILOTED CHECK VALVE

(71) Applicant: Larry Rayner Russell, Houston, TX (US)

(72) Inventor: Larry Rayner Russell, Houston, TX (US)

(*) Notice: Subject to any disclaimer, the term of this patent is extended or adjusted under 35 U.S.C. 154(b) by 186 days.

(21) Appl. No.: 14/171,325

(22) Filed: Feb. 3, 2014

(65) Prior Publication Data

US 2014/0144526 A1 May 29, 2014

Related U.S. Application Data

(63) Continuation-in-part of application No. 13/632,890, filed on Oct. 1, 2012, now abandoned, which is a continuation-in-part of application No. 13/066,817, filed on Apr. 26, 2011, now abandoned.

(60) Provisional application No. 61/343,381, filed on Apr. 28, 2010.

(51) Int. Cl.
| | |
|---|---|
| *F16K 25/00* | (2006.01) |
| *F16K 15/18* | (2006.01) |
| *E21B 21/10* | (2006.01) |
| *E21B 34/00* | (2006.01) |

(52) U.S. Cl.
CPC ............. *F16K 15/18* (2013.01); *E21B 21/10* (2013.01); *E21B 2034/002* (2013.01); *E21B 2034/005* (2013.01); *Y10T 137/7841* (2015.04)

(58) Field of Classification Search
CPC .............. E21B 21/10; E21B 2034/005; E21B 2034/002; Y10T 37/7841
USPC ...................................... 137/512.2
See application file for complete search history.

(56) References Cited

U.S. PATENT DOCUMENTS

| | | |
|---|---|---|
| 586,618 A | 7/1897 | Noll |
| 3,146,792 A | 9/1964 | Donnelly et al. |
| 3,236,255 A | 2/1966 | Phillips |
| 3,543,793 A | 12/1970 | Dollison |
| 3,743,015 A | 7/1973 | Mott |
| 3,827,494 A | 8/1974 | Crowe |
| 3,993,136 A | 11/1976 | Mott |
| 4,078,268 A | 3/1978 | Possis |
| 4,154,303 A | 5/1979 | Fournier |
| 4,160,478 A | 7/1979 | Calhoun et al. |
| 4,178,638 A | 12/1979 | Meyer |
| 4,254,836 A | 3/1981 | Russell |
| 4,262,693 A | 4/1981 | Giebeler |
| 4,265,305 A | 5/1981 | Stone et al. |
| 4,273,186 A | 6/1981 | Pearce et al. |

(Continued)

*Primary Examiner* — Kevin Lee
*Assistant Examiner* — P. Macade Nichols
(74) *Attorney, Agent, or Firm* — Elizabeth R. Hall

(57) ABSTRACT

A self piloted check valve which utilizes closure of a piloting flapper valve to permit development of closure forces for a ball valve. The normally open ball valve has a central flow passage and simultaneously rotates and translates as it traverses between its fully open and fully closed positions. An opening bias system utilizes a combination of a first less stiff spring and a second stiffer spring. Reversible decoupling means disconnects and reconnects the second spring at a short travel distance from the normally open position of the ball, while the first spring always provides opening bias forces to the ball. The pressure induced force required to fully close the ball valve following decoupling of the second spring is more than the force required to overcome the combination of the first and second springs. Additionally, while the secondary spring is engaged, hydrodynamic damping of the ball opening movement is provided.

21 Claims, 7 Drawing Sheets

(56) References Cited

U.S. PATENT DOCUMENTS

| | | |
|---|---|---|
| 4,377,179 A | 3/1983 | Giebeler |
| 4,406,022 A | 9/1983 | Roy |
| 4,664,195 A | 5/1987 | Deaton |
| 4,716,011 A | 12/1987 | Taleyarkhan |
| 4,779,852 A | 10/1988 | Wassell |
| 4,846,221 A | 7/1989 | Kanemaru |
| 5,636,661 A | 6/1997 | Moyes |
| 6,125,930 A * | 10/2000 | Moyes ............ E21B 34/066 166/317 |

* cited by examiner

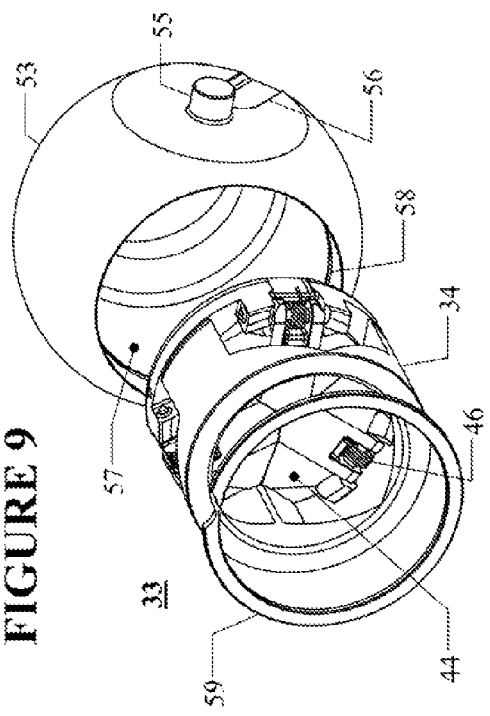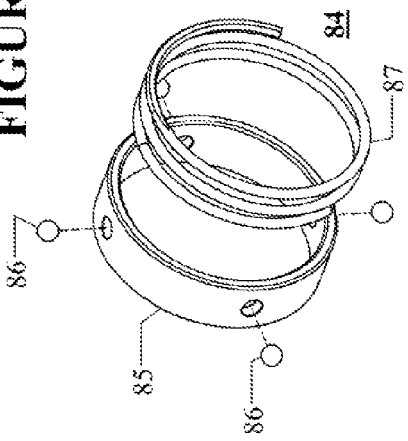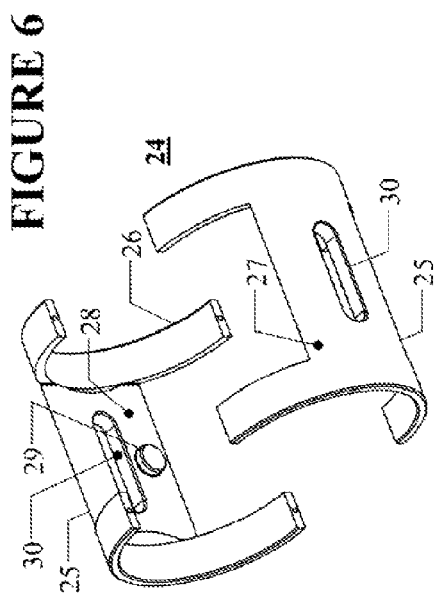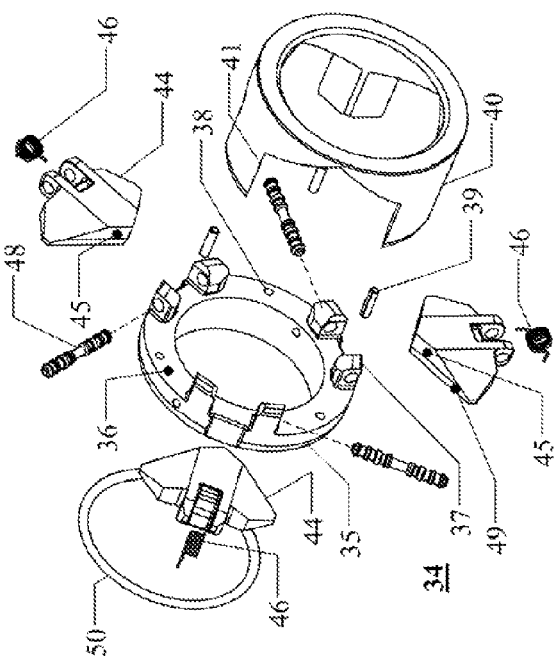

BIAS FORCE VERSUS
BALL VALVE DISPLACEMENT

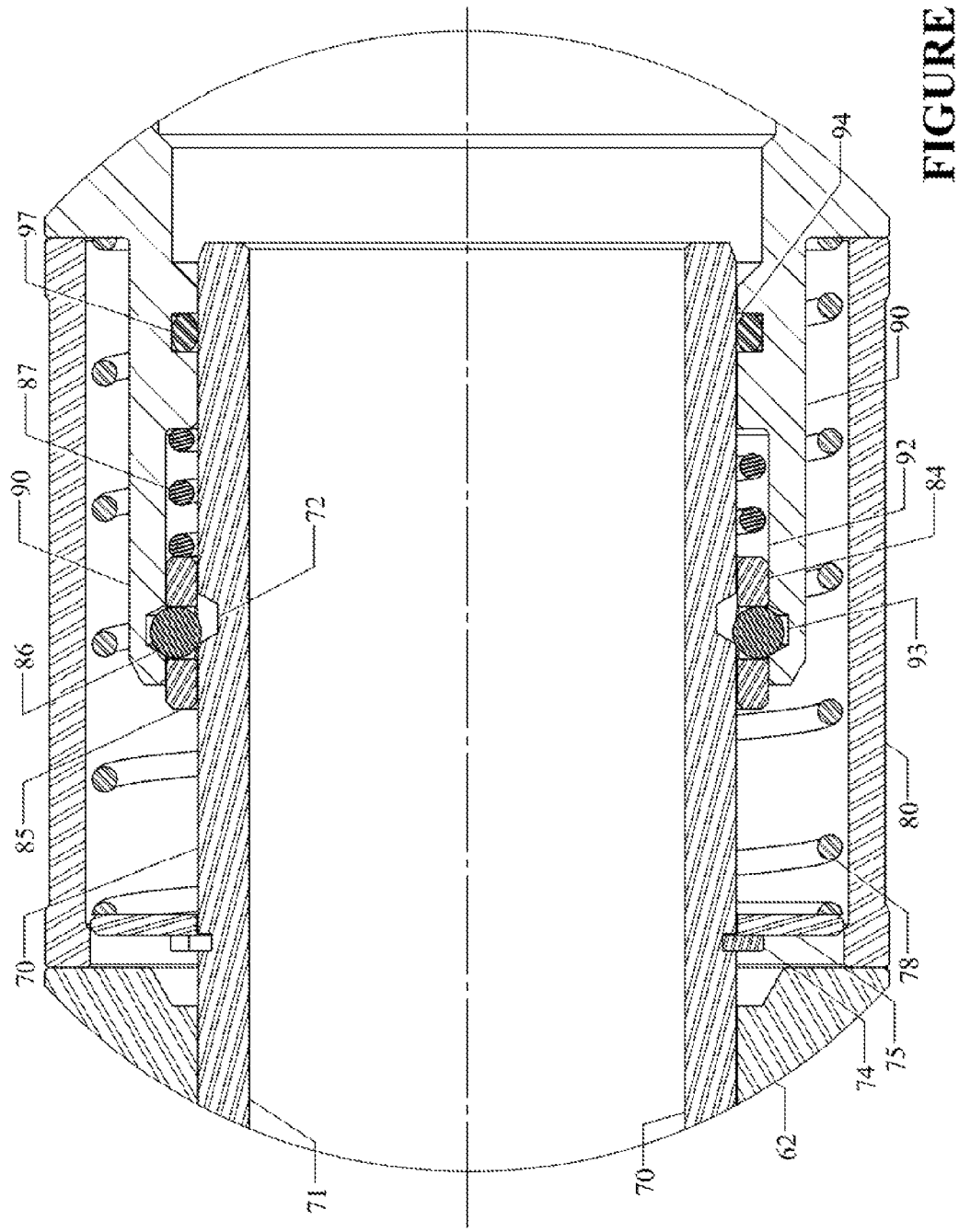

SELF PILOTED CHECK VALUE

CROSS REFERENCE TO RELATED APPLICATIONS

The present application is a continuation-in-part of U.S. Ser. No. 13/632,890 filed Oct. 1, 2012, entitled "Self Piloted Check Valve" by inventor Larry Rayner Russell, which is a utility application U.S. Ser. No. 13/066,817 filed Apr. 26, 2011, entitled "Self Piloted Check Valve" by inventor Larry Rayner Russell, which claims the benefit under USC 119 of the tiling date of provisional application Ser. No. 61/343,381 filed Apr. 28, 2011 entitled "Check Valve"

BACKGROUND OF THE INVENTION

1. Field of the Invention

The present invention relates in general to a method and apparatus for controlling fluid flow using a check valve. More particularly, the invention relates to a self piloted check valve for controlling fluid flow in high vibration environments.

2. Description of the Related Art

Check valves are used in a wide variety of applications. Historically, conventional check valves are generally the least reliable type of valve. This is a consequence of flow for an open valve continually passing both the seat and the sealing plug or ball of those check valves. This problem can lead to very rapid valve failure, particularly in abrasive flow applications or when larger objects pass by the valve. Oilfield applications, particularly use in the drilling of wells, typically cause conventional poppet valves or flapper valves to leak in 15 hours or less of service. Such check valve applications are particularly critical, since they provide the first line of defense against well blowouts.

Another major problem for any check valve is survival in high vibration environments. Relative motion of components resulting from high vibrations can rapidly induce wear in the constituent valve components, particularly in abrasive environments, such as oilfield drilling muds or slurries. When a valve is used immediately above the bit in oilfield drilling, it is commonly termed a "float valve". While all components in a drill string are subject to relatively high vibrations, float valves are exposed to very high vibratory accelerations of 10 times gravity or more while passing flows often in excess of 600 gallons per minute. Relative motion of adjacent parts in the abrasive drilling fluid environment can cause rapid wear sufficient to cause misalignment between the sealing member of a valve and its valve seat. The very high flow rates in drill strings also can cause severe flow induced vibrations in parts in the flow passage of the valve. Flow induced vibrations in abrasive environments can lead to rapid wear in both any exposed components and their supports.

The earlier self piloted check valve, covered by U.S. Pat. Nos. 4,220,176 and 4,254,836, performs exceptionally well in nonvibratory environments. While the check valve covered by these earlier patents is exceptionally durable and can in general operate without maintenance for much longer periods than other types of check valve, improvements to the existing design are needed in its resistance to vibration induced wear caused by vibrational relative motion between adjacent valve components induced by both drillstring motions and flow induced vibrations of parts in the flow passage of the valve.

A critical need exists for an improved check valve which has enhanced resistance to both flow induced and vibration induced wear.

SUMMARY OF THE INVENTION

Embodiments of the present invention include a self piloted check valve which utilizes closure of a piloting flapper valve to permit development of closure forces for a ball valve. The normally open ball valve has a central flow passage and simultaneously rotates and translates as it traverses between its fully open and fully closed positions. An opening bias system utilizes a combination of a first less stiff spring and a second stiffer spring. The function of the second bias spring is to provide additional urging to the ball to minimize its vibratory motion tendencies when in its normally open position. Reversible decoupling means disconnects and reconnects the second spring at a short travel distance from the normally open position of the ball, while the first spring always provides opening bias forces to the ball. The pressure induced force required to fully close the ball valve following decoupling of the second spring is more than the force required to overcome the combination of the first and second springs.

One aspect of the present invention is a self-piloted check valve with a main spring and a second biasing spring. Another aspect of the present invention is a self piloted check valve providing a housing closely shrouding the open piloting flapper valve in order to minimize the formation of flutter inducing vortices and yet another aspect of the present invention provides the hydraulic damping of vibratory motion of the open ball valve in order to limit vibration of the ball.

One embodiment of the present invention is a valve apparatus comprising: (a) a tubular body having a main counterbore; and (b) a plurality of internal valving components housed within the main counterbore, wherein the internal valving components have a first end and a second end transverse to the main counterbore, the internal valving components including: (i) a ball seat having a seat flow passage; (ii) a ball valve having a valve flow passage, wherein the ball valve is movable with simultaneous directly related rotation and translation to a first ball position with the valve flow passage in axial alignment with the main counterbore of the tubular body, a second ball position abutting the ball seat wherein the valve flow passage is not in fluid communication with the seat flow passage such that the main counterbore of the tubular body and the flow passage are closed, and a third ball position intermediate between the first and second ball positions; (iii) a pilot valve mounted within the valve flow passage, the pilot valve comprising a plurality of flappers, wherein each flapper is mounted on an individual flapper pivot pin and is rotatable between a closed position and an open position and wherein each flapper has a flapper bias spring that biases the flapper toward the closed position; (iv) a spring biasing system for providing a bias on the ball valve, the spring biasing system including a first spring and a second spring, wherein the first spring provides a continuous bias on the ball valve to urge the ball valve towards the first ball position and wherein the second spring is activated to bias the ball valve towards the first ball position only when the ball valve is at the first ball position or when the ball valve is moving between the first ball position and the third ball position; and (v) a motion damping device that increases a dampening of a vibratory motion on the ball between the first ball position and the third ball position.

A second embodiment of the present invention is a valve apparatus comprising: (a) a tubular body having a main counterbore; and (b) a plurality of internal valving components housed within the main counterbore, wherein the internal valving components have a first end and a second end transverse to the main counterbore, the internal valving components including: (i) a ball seat having a seat flow passage; (ii) a ball valve having a valve flow passage, wherein the ball valve is movable with simultaneous directly related rotation about an axis of rotation and translation to a first ball position with the valve flow passage in axial alignment with the main counterbore of the tubular body and a second ball position abutting the ball seat wherein the valve flow passage is not in fluid communication with the seat flow passage such that the main counterbore of the tubular body and the valve flow passage are closed thereby preventing flow through the valve apparatus; (iii) a spring biasing system for providing a bias on the ball valve, the spring biasing system including a reciprocable latching system, a first spring and a second spring, wherein the first spring provides a continuous bias on the ball valve to urge the ball valve towards the first ball position and wherein the second spring is activated to bias the ball valve toward the first ball position only when the ball valve is at the first ball position or moving between the first ball position and the third ball position; and (iv) a pilot valve mounted within the valve flow passage, the pilot valve comprising a plurality of flappers wherein each flapper is rotatable between a closed position and an open position and wherein each flapper has a flapper bias spring that biases the flapper toward the closed position; whereby a fluid flowing in a first direction from the first end of the valving components toward the second end of the valving components with sufficient force to overcome the bias of the flapper bias springs rotates the flappers to the open position allowing fluid flow through the valve flow passage and wherein the fluid flowing in a second direction from the second end of the valving components toward the first end of the valving components with sufficient force against the flappers in the closed position to overcome the bias of the first and second springs will rotate the ball valve to the second ball position.

A third embodiment of the present invention is a valve apparatus comprising: (a) a tubular body having a main counterbore; and (b) a plurality of internal valving components housed within the main counterbore, wherein the internal valving components have a first end and a second end transverse to the main counterbore, the internal valving components including: (i) a ball valve having a flow passage, wherein the ball valve is movable with simultaneous directly related rotation about an axis of rotation and translation to a first ball position with the flow passage in axial alignment with the main counterbore of the tubular body and to a second ball position such that the main counterbore of the tubular body and the valve flow passage are closed to fluid flow; (ii) a ball seat having a seat flow passage, wherein when the ball valve is in the second ball position a spherical surface of the ball valve sealingly abuts a comatable spherical surface of the ball seat such that fluid flow past the ball seat is prevented and the ball flow passage is not in fluid communication with the seat flow passage; (iii) a ball cage that supports the ball valve, wherein the ball cage is stationarily positioned in the main counterbore of the tubular body and eccentrically engages the ball valve eccentric to a ball valve axis of rotation through a pair of opposed eccentric pins mounted on the ball cage; (iv) a spring biasing system for providing a bias on the ball valve, the spring biasing system comprising: a ball pusher seat having a ball side and an opposed side, wherein the ball side bears against a first side of the ball valve; a tubular ball pusher mounted on the opposed side of the ball pusher seat, wherein the internal diameter of the ball pusher equals the diameter of the flow passage of the ball valve; a spring retainer, wherein a portion of the spring retainer encircles a portion of the ball pusher; a first spring; a second spring; and a reciprocable latching mechanism, wherein the latching mechanism is coupled to the ball pusher when the ball valve is in the first ball position, the latching mechanism uncouples at an intermediate point when the ball valve is moving from the first ball position to the second ball position and recouples at the intermediate point when the ball valve is moving between the second ball position and the first ball position, and the latching mechanism is coupled to the spring retainer when the ball valve is in the second ball position; and (v) a pilot valve mounted within the ball valve flow passage, the pilot valve comprising a plurality of flappers, each flapper rotatable between a closed position and an open position, wherein a flapper bias spring biases each flapper toward the closed position; whereby a fluid flowing in a first direction from the first end of the valving components toward the second end of the valving components with sufficient force to overcome the bias of the flapper bias springs rotates the flappers to the open position allowing fluid flow through the ball valve flow passage and wherein the fluid flowing in a second direction from the second end of the valving components toward the first end of the valving components with sufficient force against the flappers in the closed position to overcome the bias of the first and second springs will cause the ball valve to rotate to the second ball position.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is an exploded oblique view of the ball cage assembly.

FIG. 7 is an exploded oblique view of the flappers and seat of the piloting flapper valve assembly.

FIG. 8 is an exploded oblique view of the latch assembly.

FIG. 9 is an exploded oblique coaxially aligned view of the piloting flapper assembly and ball.

FIG. 16 is a detail view taken within the circle 16 shown in FIG. 4. The view shows the relationship of the latch balls and their adjacent parts at the time that a disconnection or reconnection of the secondary spring biased trigger sleeve to the ball pusher occurs when the ball valve is respectively closing or reopening.

DESCRIPTION OF THE PREFERRED EMBODIMENTS

Embodiments of the present invention include a self piloted check valve which utilizes closure of a piloting flapper valve to permit development of closure forces for a ball valve. The normally open ball valve has a central flow passage and simultaneously rotates and translates as it traverses between its fully open and fully closed positions. An opening bias system utilizes a combination of a first less stiff spring and a second stiffer spring. The function of the second bias spring is to provide additional urging to the ball to minimize its vibratory motion tendencies when in its normally open position. Reversible decoupling means disconnects and reconnects the second spring at a short travel distance from the normally open position of the ball, while the first spring always provides opening bias forces to the ball. The pressure induced force required to fully close the ball valve following decoupling of the second spring is more than the force required to overcome the combination of the first and second springs.

The self piloted check valve of the present invention is generally suitable for high reliability applications where no rapid cycling of the valve is required. The materials of the valve typically are low alloy steel, with elastomeric seals sealing between parts as required. The flappers will be an abrasion resistant material such as a wear resistant cobalt alloy. With only minor or no modifications, the basic internals of the self piloted check valve are suitable for use with several different housing body types, as described below in three examples.

Inside Blowout Preventer Valve

Figure 1:
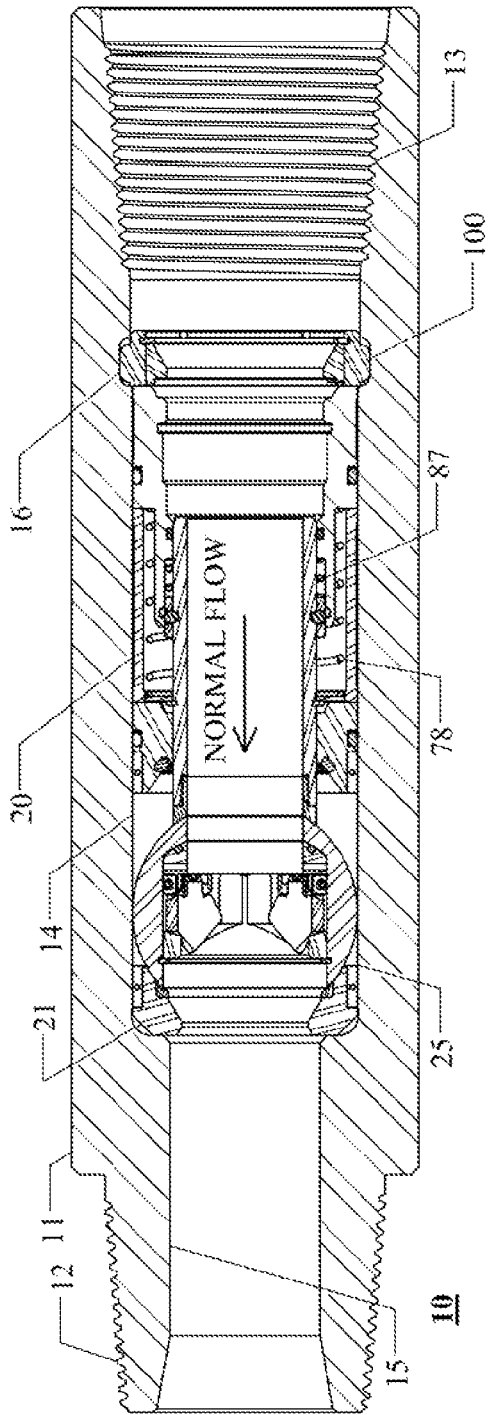
FIG. 1 shows a longitudinal section taken of the check valve housed in a tubular body suitable for connection into an oilfield drill string, whereby it can operate as an inside blowout preventer valve.

One embodiment of the check valve is suitable for placement in an inside blowout preventer valve (inside BOP). Referring to FIG. 1, one embodiment of the self piloted check valve 10 is shown in a longitudinal sectional view as an inside blowout preventer, wherein its internal components 20 are mounted in a body 11 suitable for interconnection into an oilfield drillstring. Provision is also made to use a split retention ring 100 with a snap ring 102 to retain the valve internal components 20 in the body 11.

The exterior of the inside blowout preventer body 11 has a constant outer diameter over most of its length and a reduced diameter tapered male thread 12 at its first, lower end. Herein, the terms upper and lower refer respectively to the normal flow inlet and the normal flow outlet. Sequentially from its upper end, the body 11 has a tapered female thread 13, a straight main bore 14 interrupted by an axially short retention groove 16 near its upper end and having a transverse lower end, and a straight reduced diameter outlet bore 15 having a short downwardly increasing diameter tapered bore at its lower end. To avoid stress concentrations, an ample radius is used at the transition between the lower end of the main bore 14 and the outlet bore 15. The recessed corners of the short retention groove 16 are also radiused for the same reason.

The primary check valve 10 internal components 20 include a ball stop 21, a ball cage assembly 24, a ball assembly 33 including an internal flapper valve assembly 34 and a main ball 53 valve, a ball pusher assembly 70, a main spring 78 and spacer sleeve 80, a latch assembly 84, a spring retainer 90, and a retaining means (e.g., split retention ring 100, interior support ring 101, and snap ring 102) to retain the inside blowout preventer internal components in the body 11.

Figure 2:
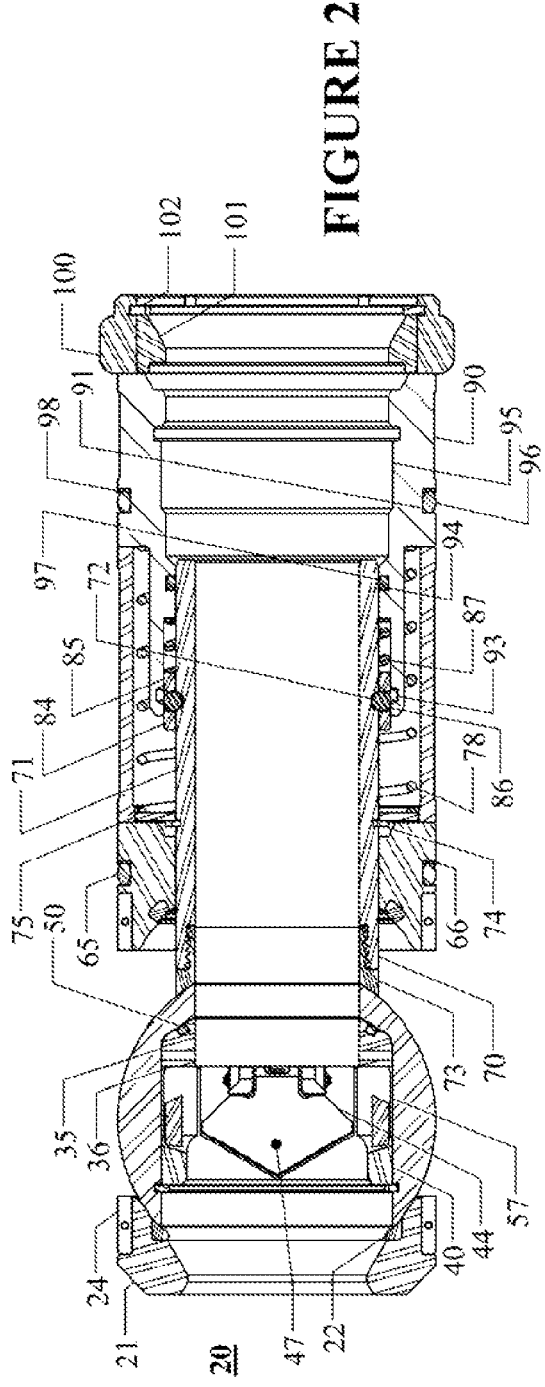
FIG. 2 shows a longitudinal section corresponding to FIG. 1, but showing only the internal component parts of the valve in its open, flowing condition. In this case, the ball is biased open by the action of two coacting, separate springs.

Referring to FIG. 2, the internal components 20 of the valve 10 of FIG. 1 are shown removed from the inside of the blowout preventer body valve 11. At the lower, normal outflow end, the valve has a ball stop 21 with an integrally molded elastomeric ball stop bumper 22 for cushioning the impact of ball 53 on the ball assembly 33 when the valve 10 opens rapidly.

The ball stop 21 is an axially short annular ring which, starting from its transverse lower end, has on its exterior a large chamfer, a short constant diameter section, a transverse external upwardly facing shoulder, and a constant reduced diameter axially upward extension. The constant reduced diameter axially upward extension closely conforms to the inner diameter of the semicircular end arm 26 half rings on the ends of the ball cage halves 25 of the ball cage assembly 24. The outer diameter of the short constant outer diameter section of the ball stop is a close slip fit to the main bore 14 of the body 11 of the inside blowout preventer 10.

From its lower interior end, the ball stop 21 has a small chamfer, a very short constant diameter through bore, a frustroconical upwardly increasing bore, a groove for containing a molded-in elastomeric ball stop bumper 22, and a spherical bore intersecting a radially narrow transverse upper end. The spherical bore of the ball stop 21 has the same diameter as that of the ball 53, so that the open ball 53 can abut the ball stop with good support over a relatively large contact surface. The elastomeric molded in ball stop bumper 22 extends a short distance inwardly from the spherical bore of the ball stop 21 so that it cushions the contact of the axially translating ball 53 with the ball stop 21 when the valve 10 is opening.

The ball cage assembly 24, shown in FIG. 6, consists of two opposed mirror image semicylindrical halves 25. Each ball cage half is symmetrical about its midplane perpendicular to the semicylindrical axis. At both its upper and lower ends, a ball cage half 25 has identical thin, axially short semicylindrical end arms 26 which have a constant rectangular cross section, wherein the radial thickness of the arm is approximately a quarter of the axial length of the arm.

The outer diameter of the semicylindrical surface of the arms 26 is a close slip fit to the main bore 14 of the body 11 for the valve 10. The inner diameter of an arm 26 closely conforms to the constant reduced outer diameter portion of the lower ball stop 21, with which it is mated in the assembled valve. The width of the arm 26 in the axial direction is the same as the length of the reduced constant outer diameter portion of the ball stop 21, and the upward looking intermediate transverse external shoulder of the ball stop abuts the lower transverse side of the arm 26 of each installed ball cage half 25.

The middle portion of the ball cage half 25 has a cylindrical outer face 27 and a flat internal face 28 spaced apart from the axis of the part and which mounts on its midplane transverse to the ball cage cylindrical axis an inwardly extending cylindrical caroming pin 29 which is normal to the face 28. The outer diameter of the middle section cylindrical surface 27 is the same as that of the semicircular end arms 26 and is also a close slip fit to the main bore 14 of the body 11 for the valve 10. The middle portion of the ball cage half 25 is symmetrically positioned between the end arms 26 so that the cylindrical external face 27 matches the outer diameter of the end arms 26. Also, the center of the middle portion of the ball cage half 25 matches the center of the arc of each of the semicircular end arms 26.

Symmetrically placed in the middle of the middle portion of each ball cage half 25 is a ball guide groove 30 parallel to the axis of the inside blowout preventer internal components 20. Groove 30 is normal to and fully penetrates the flat middle section of the ball cage half 25. The groove 30 extends in the axial direction perpendicular to the flat internal face 28 and has semicircular ends with parallel flat sides. An inwardly extending cylindrical camming pin 29 is located at midlength of the ball cage half 25 and offset to one side of the ball guide groove 20.

The ball assembly 33 consists of a ball 53, a snap ring 59, and a piloting flapper valve assembly 34 which is mounted internally in the ball 53, as indicated in an exploded view in FIG. 9. The pilot flapper valve assembly 34 is shown in exploded view in FIG. 7. The flapper valve assembly 34 primarily consists of a flapper seat ring 35, a flapper shroud 40, and three flappers 44. The flappers 44 are individually connected to trunnions 37 on the flapper seat ring 35 by flapper pivot pins or shafts 48 and are biased to be normally closed by torsional flapper springs 46.

The flapper seat ring 35 is a cylindrical ring having a transverse seating surface 36 and a right circular cylindrical coaxial through bore. The diameter of the through bore is the same as the diameter of the through hole for the ball 53. On its exterior surface, a short right circular cylindrical surface adjoins the seating surface 36 and is joined by a fillet to a frustroconical end surface opposed to the seating surface 36. A male annular O-ring groove containing externally sealing O-ring 50 is positioned on the frustroconical face of the flapper seat ring 35.

Mounted on 120° spacings on seating surface 36 of the flapper seat ring 35 are three flapper support trunnions 37. Each flapper support trunnion 37 consists of a pair of mirror image spaced apart projections normal to the seating surface 36. The trunnions 37 each have a hinge bore parallel to and spaced apart from the surface of the seating surface 36 and perpendicular to the midplane of that trunnion 37.

On the external cylindrical side of the flapper seat ring 35 between the trunnion 37 halves, flat bottom spring recesses parallel to the axis of symmetry of the ring are machined to provide clearance and support for the reaction arms of the torsional flapper bias springs 46. Equispaced on a circular pattern and symmetrically placed between each adjacent pair of trunnions 37 is a small diameter blind alignment pin hole 38 parallel to the axis of symmetry of the flapper seat ring and penetrating the seating surface. The alignment pins 39 are short roll pins which have an interference fit with the alignment pin holes 38.

The flapper shroud 40 is a right circular cylindrical annular ring having a length equal to about 80% of its outer diameter. The outer diameter of the flapper shroud 40 matches that of the flapper seat ring 35. As seen in FIGS. 7 and 9, the flapper recesses 41 are three radially penetrating identical windows located at 120° spacings in the flapper shroud. The recesses 41 are cut in the flapper shroud 40 from its first end to closely accommodate the open flappers 44 of the flapper and seat assembly 34 which protects the downstream edges of the open flappers.

The flapper recesses 41 are symmetrical about their radial midplanes and have parallel sides extending approximately half of the axial length of the shroud 40. The inner end of each flapper recess 41 has converging opposed sides each inclined at 60° from the radial midplane of the recess. The converging opposed sides of the inner end of each flapper recess 41 have only a small gap between it and the downstream edges of an open flapper 44 whenever the flappers 44 of the flapper valve assembly 34 are open, thereby minimizing the formation of flutter inducing vortices.

The first end of the flapper shroud 40 has three small diameter blind holes parallel to the part axis in the same pattern as the alignment pin holes 38 of the flapper seat ring 35 and with each hole located midway between adjacent flapper recesses 41. These holes have an interference fit with the alignment roll pins 39 of the flapper seat ring 35 and serve to permit the roll pins to firmly connect the shroud with the seat ring.

The flappers 44 are three identical abrasion resistant metal pieces made of a material such as a wear resistant cobalt alloy. The flappers 44 have a planar primary sealing face 47 on a first side and have a single plane of symmetry perpendicular to their sealing face. A second planar face is opposed and parallel to the planar flapper sealing face and extends in the direction of the plane of symmetry. The width of the second planar face is approximately 30% of the width of the flapper 44 perpendicular to its plane of symmetry. Outboard of the second planar face on each side, the thickness of the flappers 44 is reduced linearly as a function of the distance from its intersection with the second planar face.

Figure 11:
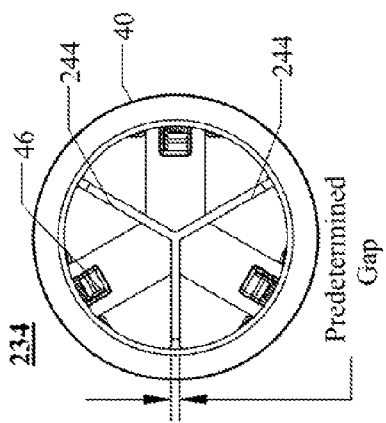
FIG. 11 is an axial view of the closed piloting flapper and seat assembly for the inside blowout preventer version of the self piloted check valve.

Viewing a flapper 44 normal to its primary sealing face 47 which will rest on the seating surface 36 of the flapper seat ring 35 when the flapper is closed, two mirror image first planar edge faces 45, each normal to the sealing face, are each inclined at 60° from the plane of symmetry and extend to small planar edge outer ends parallel to the plane of symmetry. The flapper edge faces 45 are slightly relieved between the midthickness of the flapper and the sealing face 47 by intersecting planar relief faces 49. This is done to permit the rotating flappers to have minimal flapper-to-flapper gaps while still permitting gap minimization between adjacent flappers. The first flapper edge faces 45 of a flapper 44 will be adjacent to corresponding faces 45 of adjacent flappers 44 when they are assembled in their closed positions in the flapper and seat assembly 34, as shown in FIG. 11.

Short second planar edge faces, inclined at 45° from the plane of symmetry and perpendicular to the sealing surface 36, extend inwardly towards the plane of symmetry from the small planar outer ends of the flapper 44. Adjoining the second planar faces on the side towards the plane of symmetry are symmetrically placed short planar faces perpendicular to both the plane of symmetry and the sealing surface on the first side of the flapper. These second planar edge faces on their inward ends are joined by third planar edge faces perpendicular to the sealing surface 36 and parallel to the plane of symmetry. The separation of the third planar edge faces is approximately the width of the second planar face which is opposed to the sealing surface on the first side of the flapper.

The third planar edge faces have a close fit between the flapper support trunnions 37 of the flapper seat ring 35.

On the third planar edge faces, through hinge holes are drilled at mid thickness of the flappers 44 and perpendicular to the midplane of symmetry. The outer end of a flapper 44 where its hinge holes are positioned is radiused about the axis of the hinge holes. A central gap, with sides parallel to the plane of symmetry, extending inwardly in the direction of the plane of symmetry is cut between the third planar faces. This central gap is wide enough to accommodate a torsional flapper bias spring 46. The second planar face opposed to the sealing face of the flapper 44 has a shallow central notch parallel to the sealing face and plane of symmetry and intersecting the central gap of the flapper 44. This shallow central notch provides a spring slot for a reaction point for an arm of the torsional flapper bias spring 46.

The flapper pivot pins or flapper shafts 48 are elongated cylindrical rods with multiple symmetrically placed molded narrow elastomeric rings along their length. The flapper pivot pins 48 are engaged both in the hinge holes of the flappers 44 and in the trunnion holes of the flapper seat ring 35. The elastomeric rings provide vibrational energy absorption and permit the flappers to seal with the seating surface 36 of the flapper seat ring 35 in spite of small deviations in hole locations for the flappers 44 and the trunnions 37 of the flapper seat ring. The converging opposed sides of the inner end of each flapper recess 41 have only small gaps with the edges 45 of the open flappers 44 whenever the flappers of the flapper valve assembly 34 are open.

Referring to FIGS. 7 and 11, the flapper and seat assembly 34 is seen to have three flappers 44 mounted to the flapper seat ring 35 by flapper pivot pins 48. The individual torsional flapper springs 46, seen in FIG. 7, are located surrounding the pins 48 in the central gaps of the flappers 44 with one arm of the spring bearing on the shallow slot of a flapper and the other on a spring slot on the outer diameter of the flapper seat ring 35.

To complete the flapper and seat assembly 34, an O-ring 50 is installed into the groove on the frustroconical face of the flapper seat ring 35 and the flapper shroud 40 is attached to the flapper seat ring by alignment roll pins 39 engaged in the holes 38 of the ring 35 and the corresponding holes in the flapper shroud 40. The closed set of flappers 44 has only a slight or zero clearance between the edges 45 of adjacent flappers to prevent mutual interference. For this reason, the flappers 44 do not form a bubble tight seal between each other when seated on the flapper seat ring 35, although the leakage through the clearance gaps between the adjacent faces 45 of the flappers 44 is trivial and does not impair closure of the ball valve 10.

The open flappers 44 also fit with only small clearance gaps into the flapper recesses 41 of the flapper shroud 40. The large planar sealing faces of the open flappers 44 are open sufficiently to permit passage of a body having the same outer diameter as the bore through the flapper seat ring 35. While the flapper valve assembly is shown with three flappers herein, closure of the flow passage of the ball can be achieved with only one or two flappers or more than three. Utilizing three flappers permits a reduction in the mass of individual flappers while minimizing potential leak paths. Additionally, use of three flappers simplifies construction of the shroud 40, as well as permitting a reduction in the size of the flapper assembly and ball for a given flow passage size without adding an excessive number of additional parts.

As seen in FIG. 9, the ball 53 has a spherical outer surface with two mirror image parallel flats on its exterior. The outer diameter of the spherical face of the ball 53 is only slightly less than the main bore 14 of the flowpath of the valve body 11. Each flat of the ball 53 has a central cylindrical guide pin 55 which is normal to its flat and is a close slip fit to a ball guide groove 30 of a ball cage half 25. The opposed guide pins 55 are located on a common ball diameter. Parallel to and centrally located between the opposed flats of the ball 53 is a through bore 57. From its large end, the through bore 57 has a long larger straight bore with a snap ring groove 58 near its outer end, an inwardly extending frustroconical face, and a coaxial shorter and smaller straight fluid entry bore.

The smaller bore diameter for the ball 53 is the same as the central bore through the flapper seat ring 35. These two bore diameters determine the through clearance hole for the valve 10. A fillet connects the frustroconical face and the larger bore. The snap ring groove 58 accommodates snap ring 59 so that when the flapper and seat assembly 34 is inserted in the larger portion of the bore 57 of the ball 53 with the orientation shown in FIG. 9, it is retained with the O-ring 50 in the annular groove of the flapper seat ring sealing between the ball and the flapper seat ring 35.

A shallow camming groove 56 is cut into each flat of the ball in a radial direction of the face, with the opposed grooves being parallel and mirror images relative to the midplane of symmetry of the ball. The inner ends of the camming grooves 56 are radiused and spaced apart from the guide pins 55. The camming grooves 56 extend outwardly to the spherical surface of the ball 53. The orientation of the camming grooves 56 is such that the through bore 57 of the ball 53 is aligned with the valve axis when the ball is open and engaged in the ball cage assembly 24.

When the valve 10 is closed by the ball, the longitudinal axis of the valve 10 penetrates the spherical face of the ball 53 midway between the exits of the large exit hole and of the small exit hole of bore 57 of the ball on the plane of symmetry of the ball. This necessitates that the axis of the camming grooves 56 to be inclined from the axis of the ball bore 57 by an angle of more than 45°.

The main seat 62 of the valve, shown in FIG. 2, is an axially relatively short hollow cylinder having a transverse upper end with a smaller relieved transverse face on its interior side. The relieved face, which provides clearance for a snap ring 74 of the ball pusher assembly 70, is connected to the larger transverse end by a short frustroconical section. The bore of the main seat 62 is straight and larger than the smaller bore through the ball 53 in order to permit a slip fit of the lower exterior end of the ball pusher assembly 70.

The exterior cylindrical face of the main seat 62 has, from its upper end, a constant diameter first section extending about half of the axial length of the seat and with an intermediately placed male O-ring groove containing an O-ring 65 and a backup ring 66. The outer diameter of the first section of the exterior cylindrical face of the main seat 62 is a close slip fit to the main bore 14 of the body 11 of the valve 10. The O-ring 65 seals between the main seat 62 and the main bore 14 of the body 11. The backup ring 66 provides additional extrusion resistance for the O-ring 65.

On its lower end, the exterior cylindrical face of the main seat 62 has an inwardly extending transverse shoulder facing downwardly. A second section having a reduced diameter cylindrical section extends downwardly to a short inwardly extending transverse shoulder. The outer diameter of the second cylindrical section is a close fit to the inner cylindrical face of the semicircular end arms 26 of the ball cage halves 25, and the length of the second cylindrical section is the same as the axial length of a ball cage end arm 26.

On its lower end, the main seat 62 has on its interior side a spherical face 63 having the same diameter as the ball 53 and having an intermediate seal ring groove. The seal ring groove is undercut and contains a molded in elastomeric face seal 64 which extends radially inwardly from the spherical face 63 of the seat 62. However, the net volume of the molded in elastomeric face seal is less than the volume of the groove in the main seat 62 due to molded ridging of the exposed face of the seal 64. This permits the avoidance of extrusive seal damage when the ball 53 forcefully abuts the spherical face of the main seat 62.

When the inside blowout preventer internal components 20 of the valve 10 are being assembled, the ball assembly 33 with its ball 53 and flapper and seat assembly 34 is held between two opposed ball cage halves 25 so that its guide pins 55 are engaged in the ball guide grooves 30 of the ball cage assembly 24 and the camming pins 29 of the ball cage assembly are engaged with the camming grooves 56 of the ball.

The lower ball stop 21 is then engaged with the lower semicircular end arms 26 of the ball cage assembly 24 so that the side of the lower ball stop with the molded in ball stop bumper 22 is facing the ball. Following this, the main seat is engaged with the upper semicircular end arms 26 of the ball cage assembly so that the side of the main seat with the spherical face 63 is facing the ball. The resultant subassembly has a slip fit with the main bore 14 of the body 11. An O-ring 65 with a backup ring 66 seals the annular gap between the main seat 62 and the main bore 14 of the body 11.

The ball pusher assembly 70 consists of ball pusher body 71, a ball pusher seat 73, a snap ring 74, and a spring washer 75. The ball pusher body 71 is an elongated thin wall right circular cylindrical tube having a transverse external annular latch groove 72 located at about 30% of the length of the ball pusher body from its upper end. Additionally, an external snap ring groove mounting snap ring 74 is located at about 60% of the length of the ball pusher body 71 from its upper end. The bore of the ball pusher body 71 is the same as the smaller bore through the ball 53. The latch groove 72 is relative shallow and narrow, with frustroconical radially outwardly opening faces inclined at approximately 60° from the axis of the ball pusher body 71 joining the groove to the outer diameter portion of the ball pusher body 71.

At its lower end, the ball pusher body 71 has a female thread which is threadedly engaged with the male thread of a ball pusher seat 73. The ball pusher seat 73 is axially short and has the same inner and outer diameters as the ball pusher body 71. The ball pusher seat 73 is fabricated from either an elastomer or a plastic polymer such as a glass filled polytetrafluoroethylene. The lower face of the ball pusher seat 73 has a concave frustroconical or spherical face which is able to sealingly bear on the spherical face of the ball 53. At its upper end, the ball pusher seat 73 has a reduced diameter male thread sealingly comatable with the female thread on the ball pusher body 71.

The spring washer 75 is a relatively thin cylindrical flat washer with a central hole which is a close slip fit to the outer diameter of the ball pusher body 71. The outer diameter of the spring washer 75 is slightly less than the bore 81 of the lower end of the spacer sleeve 80 so that it also has a close slip fit to the spacer sleeve. The diameter difference is typically on the order of 0.005 to 0.010 inch. The resulting limited annular space between the lower bore of the spacer sleeve 80 and the outer diameter of the spring washer 75 serves as a hydraulic damping orifice. The spring washer 75 is located on the upper side of the mounted snap ring 74 and bears against the snap ring. In turn, the lower end of the helical main spring 78 bears against the upper side of the spring washer 75 and when the spring is compressed, it urges the ball pusher assembly 70 downwardly so that the ball pusher seat 73 normally remains in contact with the ball 53. The upper end of the main spring 78 bears against a downwardly facing transverse shoulder of the spring retainer 90.

The spacer sleeve 80 is a thin wall right circular cylindrical sleeve with transverse ends and the central portion of its outer diameter slightly relieved. The spacer sleeve 80 has a length equal to about 75% of its outer diameter and abuts against both the upper end of the main seat 62 and the larger diameter lower transverse face of the spring retainer 90. The outer diameter of the spacer sleeve is a slip fit to the main bore 14 of the body 11 of the valve 10. The outer diameter of the main spring 78 has sufficient clearance with the bore of the spacer sleeve 80 to ensure clearance, even when the main spring is fully compressed. The lower end bore 81 of the spacer sleeve 80 has a close fit to the spring washer 75 for a short distance from the lower end, but the upper end bore 82 is enlarged. The length of the reduced bore 81 of the spacer sleeve 80 is approximately equal to the upward travel distance of the ball pusher assembly 70 required to disengage the secondary spring 87 of the latch assembly 84. The latch assembly 84 is discussed in more detail below.

The latch assembly 84 consists of an axially short thin wall right circular cylindrical latch sleeve 85, multiple latch balls 86, and a secondary spring 87. The inner diameter of the latch sleeve 85 is a slip fit to the outer diameter of the ball pusher body 71. The latch sleeve 85 is provided with multiple equispaced radial holes in a transverse plane located at midlength of the sleeve and is axially reciprocable. The radial holes are close slip fits to the latch balls 86.

The radial wall of the latch sleeve 85 is approximately 60% of the diameter of the latch balls 86. When the radial holes of the latch sleeve 85 are positioned to be coplanar with the middle of the annular latch groove 72 of the ball pusher body 71, the latch balls 86 positioned in the radial holes and abutting the minimum diameter portion of the latch groove 72 do not extend beyond the outer diameter of the latch sleeve 85.

The secondary spring 87 of the latch assembly 84 is a stiff short helical spring with an inner diameter slightly larger than the outer diameter of the ball pusher body 71 and an outer diameter slightly smaller than that of the latch sleeve 85. The secondary spring 87 is mounted coaxially with the spring retainer 90 and the latch sleeve 85 of the latch assembly 84. The secondary spring 87 bears against the upper end of the latch sleeve 85 and a downwardly facing transverse end of a downwardly opening interior secondary spring recess 92 of the spring retainer 90.

The spring rate of the secondary spring 87 is higher than that of the main spring 78, but the maximum axial force applied to the ball pusher assembly 70 by the secondary spring 87 is less than the maximum force ever applied to the spring washer 75 of the ball pusher by the main spring 78. Further, the maximum combined force of the main spring 78 and the secondary spring 87 is less than the peak force on the ball pusher assembly 70 applied by the main spring 78 alone.

The force from the secondary spring 87 acts on the latch sleeve 85 and also the ball pusher assembly 70 as long as the latch sleeve is engaged with the ball pusher assembly by the latch balls 86. The releasable interconnection which permits axial loads to be transferred from the radial holes of the latch sleeve 85 to the annular latch groove 72 of the ball pusher body 71 is provided by the radially reciprocable latch balls 86, which are radially reciprocable in the radial holes of the latch sleeve.

The spring retainer 90 is a right circular cylindrical sleeve with a length slightly longer than its outer diameter. From its upper end, the spring retainer 90 has on its exterior side a first cylindrical section which has an outer diameter which is a close slip fit to the main bore 14 of the body 11 of the valve 10. This first section has a length equal to approximately half of the total length of the spring retainer and contains an annular male O-ring groove 91 mounting an O-ring 96 and backup ring 98 which provide sealing between the spring retainer 90 and the main bore 14 of the valve body 11.

An inwardly extending downwardly facing intermediate transverse shoulder on the lower end of the first cylindrical section connects to a reduced diameter second external cylindrical section which extends to the lower end of the spring retainer 90. The outer diameter of the second external cylindrical section is such that it provides clearance to the inner diameter of the main spring 78. The intermediate downwardly facing shoulder abuts both the upper end of the main spring 78 and the upper end of the spacer sleeve 80. A chamfer joins the lower end of the second external cylindrical section to a narrow downwardly facing transverse end.

From its lower end, the bore of the spring retainer 90 has a first counterbore with a transverse inner end serving as a secondary spring recess 92 and containing an intermediate female annular latch groove 93. The annular latch groove 93 has a short central enlarged constant diameter section with radially inwardly opening chamfers at its upper and lower ends extending to the counterbore for the secondary spring recess 92. The angle of these chamfers from the axis of the spring retainer 90 is approximately 60°.

The depth of the annular latch groove 93 is such that, when a latch ball 86 is positioned in the groove at its maximum radially outward position, the innermost portion of the ball will clear the outer diameter of the ball pusher assembly 70. The diameter of the counterbore of the secondary spring recess 92 is a close slip fit to the outer diameter of the latch sleeve 85. The length of the secondary spring recess is sufficiently long to fully contain the installed secondary spring 85 and most of the length of the latch sleeve 85 when the secondary spring 87 is compressed to its minimum service length.

Adjoining the secondary spring recess 92 at its upper end is a smaller short straight bore which contains an intermediate female O-ring groove 94 mounting O-ring 97. The diameter of this bore is such that it has a close slip fit with the outer diameter of the ball pusher body 71. The O-ring 97 seals between the spring retainer 90 and the outer diameter of the ball pusher assembly 70.

At the upper end of the short straight bore with O-ring groove 94, an intermediate complex counterbore provides a female landing profile 95 for a lock-open tool which is not described herein. This concave profile varies, depending upon the type of lock-open tool to be used with the valve. Upwardly sequentially from the lower end of profile 95 are located an outwardly opening chamfer, a first profile counterbore, another upwardly opening chamfer, a larger second profile counterbore, a narrow female groove, and a short inwardly extending shoulder which has a counterbore smaller than that of the second counterbore.

The inwardly extending shoulder and the female groove of the landing profile 95 permit the extraction, using a puller device, of the spring retainer 90 from the main bore 14 of the body 11 of the valve 10 during valve disassembly. For the assembled valve 10, the upper transverse face of the spring retainer 90 is adjacent to the lower end of the latch groove 16 of the body 11 of the valve.

Figure 10:
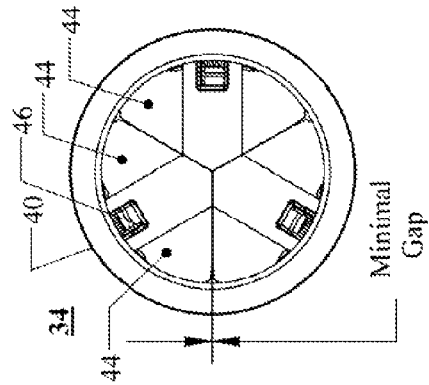
FIG. 10 is an exploded oblique view of the components used to retain the valve internals within the body of the inside blowout preventer body.

The inside blowout preventer internal components 20 of the valve 10 are retained within the body 11 of the valve by the combination of the installed split retention ring 100, the solid interior support ring 101, and the male snap ring 102. Referring to FIG. 10, these components can be seen in an exploded view. The split retention ring 100 has a cross section with a straight interior bore having near its upper end a female snap ring groove for the mounting of snap ring 102. The lower transverse end of the cross section of the split retention ring 100 is joined to the right circular cylindrical external side by a liberally radiused corner.

Near its upper end, the cross section of the external cylindrical side of the split retention ring 100 has a short reduced diameter section joined to the larger diameter section below, with a second radiused upper corner serving as the transition to the reduced diameter section. The radius of both external corners of the larger outer diameter section is the same. The outer diameter of the split retention ring is a close fit to the diameter of the groove 16 of the body 11. The outer diameter of the reduced diameter section at the upper end of the ring 100 is a slip fit to the main bore of the body 11 of the valve 10. The length of the larger diameter portion of the split retention ring 100 is equal to or slightly less than the axial length of the latch groove 16 of the valve body 11.

As seen in FIG. 10, the split retention ring 100 is separated into four parts by two parallel cuts made parallel to but equally offset to opposite sides from the axis of symmetry of the part. The length of the longer segments of the ring 100 is less than the diameter of the main bore 14 of the body 11 of the valve 10. This permits the radial insertion of the diametrically opposed longer segments of the split retention ring 100 into groove 16 of the body 11 followed by the radial insertion of the shorter segments of the split ring 100 into the gaps between the longer segments. The upper transverse end of the spring retainer 90 of the other assembled valve internals 20 is abutted on its upper end by the downwardly facing transverse shoulder of the split retention ring 100.

The interior support ring 101 has an outer diameter which is a close slip fit to the straight interior bore of the installed split retention ring 100. The length of the interior support ring 101 is just slightly less than the distance from the lower transverse end to the lower side of the female retaining ring groove of the split retention ring 100. The interior support ring 101 has two opposed narrow transverse ends. The interior side of the interior support ring has from its upper end a frustroconical converging bore, a downwardly facing transverse shoulder, and a downwardly facing short counterbore engagable by a puller tool so that the ring can readily be extracted during valve 10 disassembly.

When the interior support ring 101 is inserted within the bore of the assembled split retention ring 100, the split retention ring is trapped within the groove 16 of the body 11 of the valve 10. In this position, the split retention ring 100 abuts the upper end of the spring retainer 90 so that the internal components 20 of the inside blowout preventer are maintained in position within the body 11 of the valve.

This is the case even when the closed valve 10 is resisting high pressures from reverse flow tendencies acting on its ball 53. The forces from pressure on the closed ball 53 and seat 62 are transferred through the split ring and into the groove 16 of the body 11. Insertion of the snap ring 102 into the female snap ring groove of the split retention ring retains the interior support ring 101 within the bore of the split retention ring, but when removed readily permits selective disassembly and removal of the rings 100, 101 so that the valve internals 20 can be removed.

Choke and Kill Manifold Check Valve

Figure 13:
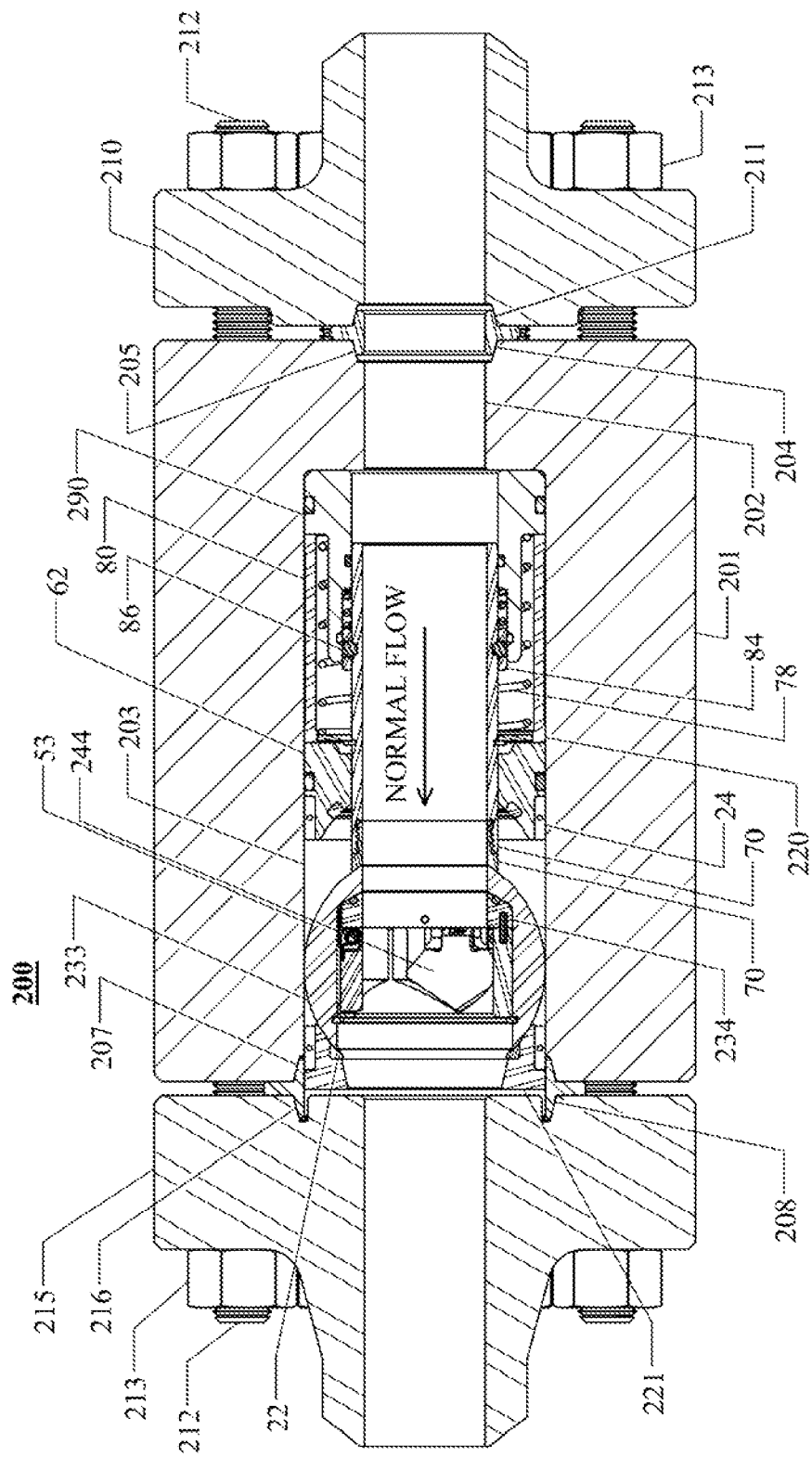
FIG. 13 is a longitudinal sectional view of a choke and kill check valve.

FIG. 13 shows a longitudinal sectional view of one embodiment of the self piloted check valve mounted in a body arrangement having attached weld neck flanges suitable for connection into an oilfield drilling choke and kill piping system. This choke and kill valve 200 has internal components which are functionally the same as those of the inside blowout preventer valve 10 with the exception of the structure and behavior of the flappers 244 of the flapper and seat assembly 234 of the valve 200. Where minor structural differences exist between the inside blowout preventer 10 and the choke and kill valve 200, the modifications are described herein.

In the case of the flappers 244, the structural change is minor and produces only a slightly exaggerated valve behavior which is exhibited to some degree for all versions of the valve. Most of the internal parts of the choke and kill manifold check valve 200 are structurally identical to those of the inside blowout preventer 10. Other than the changes to the flappers 244, minor changes to some parts are necessitated for mounting the valve internals in a different type of body, but both those parts and the choke and kill manifold valve 200 function in substantially the same manner as the inside blowout preventer 10.

Referring to FIG. 13, the choke and kill valve body 201 is a right circular cylindrical body with a constant outer diameter equal to approximately 65 percent of its length. At its first end, the body 201 has a short fluid entry bore 202 which has a diameter equal to the inner diameter of the valve internals 220. The main bore 203 is a counterbore for the entry bore 202 and enters from the end opposed to the end with the fluid entry bore 202 and has a diameter which is a close slip fit to the choke and kill valve internal components 220. The length of the main bore 203 is such that the valve internals 220 can be fitted into the bore both with allowance for fabrication tolerances and without interfering with mounting of the large seal 208 and the large flange 215.

Both ends of the choke and kill valve body 201 are provided with regular arrays of drilled and tapped holes for engagement by flange bolting. The drilled and tapped holes are parallel and equally offset from the longitudinal axis of the body 201. On its outer end the fluid entry bore 202 has a short inwardly converging frustroconical small seal recess 204 which mounts a commercially available small diameter metallic seal 205.

The annular small metallic seal 205 has a thin central flange on its outer side with a straight through bore equal to that of the short fluid entry bore 202. The seal 205 has mirror image seal surfaces which externally radially inwardly taper with distance from the central flange. The tapered seal surfaces seal with an interference fit with the small seal recesses 204 and 211 when the seal flange is clamped between the body 201 and the small flange 210.

On its outer end the main bore 203 has a short inwardly converging frustroconical large seal recess 207 which mounts a large diameter metallic seal 208. The annular large diameter metallic seal 208 has the same type of construction and operation as that of the small metallic seal 205, with the only difference being related to seal size. The tapered large seal surfaces seal with an interference fit with the large seal recesses 207 and 216 when the seal flange is clamped between the body 201 and the large flange 215.

The small flange 210 is a typical bolted weld neck flange, but it has a seal groove appropriate for use with seal 205. The outer diameter of the small flange 210 is the same as that of the body 201 and its through bore is the same as that of the valve internals 220. Flange 210 has a regularly spaced pattern of bolt holes offset from its axis of symmetry corresponding to those on the inlet end of the body 201 and a cylindrical weld neck that extends outwardly on the back side of the flange. On the entry to the through bore on the side facing the valve body 201, the flange 210 has a small seal recess 211 identical to the small seal recess 204 of the body. Studs 212 and nuts 213 are used to clamp the small flange 210 to the body 201 and to energize the seal 205.

The large flange 215 also is a typical bolted weld neck flange, but thicker than the small flange 210. The outer diameter of the large flange 215 is the same as that of the body 201 and its through bore is the same as that of the valve internals 220. Flange 215 has a regularly spaced pattern of bolt holes corresponding to those at the exit of the main bore 203 of the body 201.

On its axis of symmetry, the large flange 215 has a cylindrical weld neck which extends outwardly on the outer side of the flange. On the entry to the through bore on the side facing the valve body 201, the flange 215 has a large seal recess 216 identical to the large seal recess 207 of the body. Studs 212 and nuts 213 are used to clamp the large flange 215 to the body 201 and to energize the seal 208.

As shown herein, the seal groove diameter for mounting the small flange 210 is smaller than that for the large flange 215, although the groove and flange for the fluid entry bore end could alternatively be made identical with that for the fluid exit end of the valve 200.

The choke and kill valve internal components 220 include a choke and kill valve lower ball stop 221, a choke and kill flapper assembly 234 with flappers 244, and a choke and kill spring retainer 290. Other than the flappers, these components differ only slightly structurally but not functionally from the corresponding components of the inside blowout preventer 10. The other choke and kill valve internal components 220 are the same as for the inside blowout preventer 10, with the exception that the split retention ring 100, the interior support ring 101, and the snap ring 102 are omitted. These omitted parts are not required because the large flange 215 serves to retain the valve internal components 220 in the valve body 201 so that they bear against the inwardly extending shoulder at the small flange end of the valve 200.

Referring to FIG. 13, the choke and kill lower ball stop 221 with its molded-in ball stop bumper 22 does not need the large chamfer on its external flow outlet corner that the inside blowout preventer ball stop 21 requires to fit in body 11. That corner for the choke and kill ball stop 221 is only lightly chamfered, and the axial length of the ball stop 221 is slightly reduced from that of ball stop 21 for the inside blowout preventer in order to limit the overall length of the valve. Otherwise, the ball stop 221 and its molded in bumper are structurally and functionally identical to the lower ball stop 21 of the inside blowout preventer 10.

For the choke and kill manifold valve 200, the ball cage assembly 24, ball 53, and main seat 62 are the same as for the inside blowout preventer 10 and are assembled with the same relationships. The ball stop 221 and the main seat 62 support the opposed halves 25 of the ball cage assembly 24. The ball 53 has its guide pins 55 engaged in the ball guide groove 30 of the ball cage assembly 24 in the same way as for the inside blowout preventer 10. The camming grooves 56 of the ball 53 are engaged by the camming pins 29 of the ball cage halves 25 in the same manner as for the inside blowout preventer 10.

Figure 12:
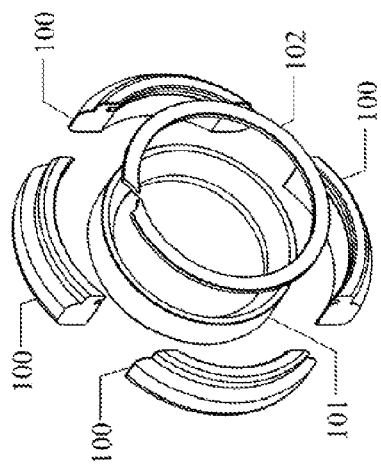
FIG. 12 is an axial view of the closed flapper and seat assembly for the choke and kill manifold version of the self piloted check valve.

The flapper and seat assembly 234 of the valve 200 is identical to the corresponding assembly 34 for the inside blowout preventer except for use of flappers 244 for valve 200. Referring to FIGS. 11 and 12, the flapper and seat assemblies 34 of the inside blowout preventer 10 and 234 of the valve 200 are respectively shown in axial views seen from their outlet sides.

Only small clearance gaps sufficient for operating clearances between adjacent flapper 44 faces are provided for the inside blowout preventer 10 flapper and seat assembly 34 shown in FIG. 11. However, some limited backflow is necessary for the choke and kill manifold valve 200 in order to accommodate valve backflows due to fluid displacement through the valve 200 in a drilling choke and kill manifold during wireline or coiled tubing operations while still providing protection against dangerous higher flows. For the choke and kill manifold valve 200, the gaps between adjacent flapper faces 244 are made larger to permit this relatively small additional reverse flow without initiating valve closure, as seen in FIG. 12. The desired size of the gap between the flappers 244 can be determined readily by calculation.

The ball pusher assembly 70, the main spring 78, the spacer sleeve 80, and the latch assembly 84 are common to both the choke and kill check valve 200 and the inside blowout preventer 10 and function the same in both devices. The choke and kill spring retainer 290 is different from the spring retainer 90 for the inside blowout preventer valve 10 because no provision for lock open tools is required for valve 200. However, the bore on the inlet end of the spring retainer 290 is enlarged sufficiently to permit engagement with puller or pusher means (not shown) to forcibly extract the choke and kill valve internals 220 from the body 201 for servicing.

Drilling Float Valve

Figure 14:
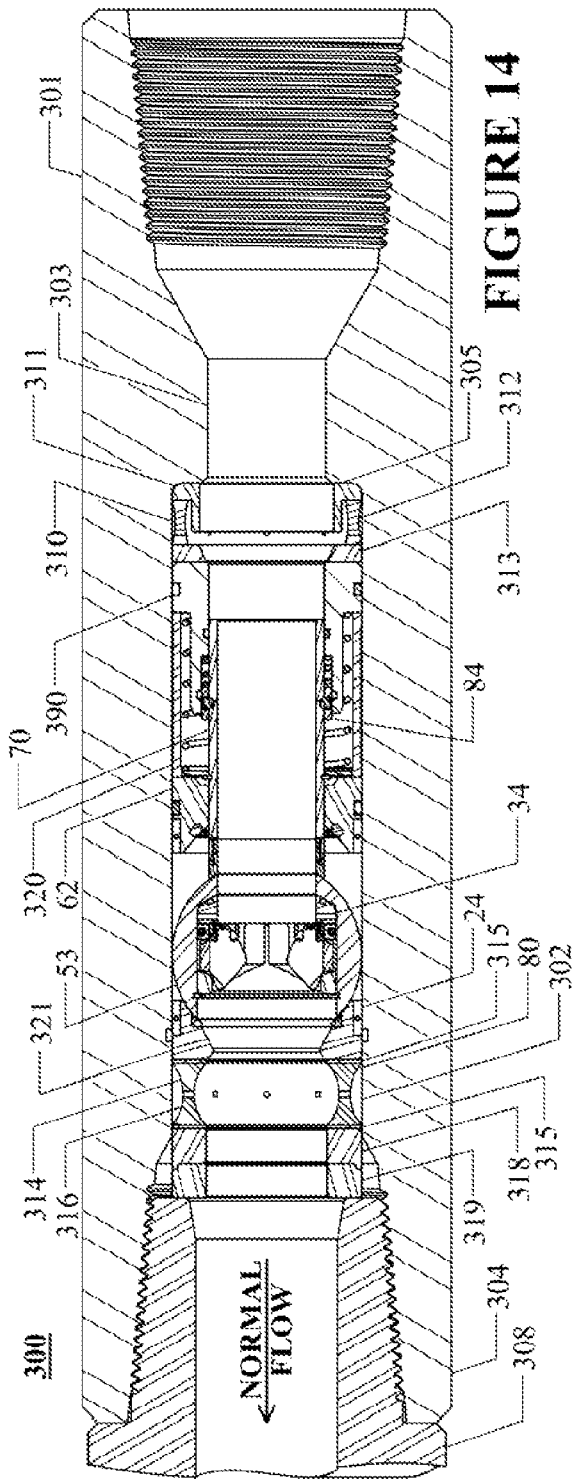
FIG. 14 is a longitudinal sectional view of a float valve version of the check valve.

FIG. 14 shows a longitudinal sectional view of one embodiment of a drilling float valve 300 installed in a housing for mounting between a drill bit and the drill collars of a drill string. Drilling float valves are routinely used near the drill bit to avoid uncontrolled backflows through the drillstring during the making of connections. The primary differences between float valves and inside blowout preventers are related to their bodies and additional provisions for the severe vibrational environment near the bit for float valves. Float valves are used routinely, rather than for emergencies, and are particularly important when the well is being drilled in an underbalanced condition.

The float valve 300 uses the same self piloted check valve with internal components which are functionally the same as those of the inside blowout preventer valve 10. The float valve body 301 differs from those of the inside blowout preventer 10 and the choke and kill valve 200. Most of the internal parts of the drilling float valve 300 are structurally identical to those of the inside blowout preventer 10 or the choke and kill manifold valve 200. Minor changes to some internal parts are necessitated for mounting the valve internals in a different type of body, but both those parts and the assembled valve 300 function in the same manner as for the inside blowout preventer 10. Some additional parts are required to ameliorate the high vibration problem for the float valve 300, but those parts do not affect the principles or manner of the flow controlling operation of the key valve components.

Referring to FIG. 14, the drilling float valve body 301 has a right circular cylindrical body with a constant outer diameter equal to approximately 25% of its length. At its transverse upper first end, the body 301 has a tapered female drill pipe thread so that it can be threadedly interconnected into a drill string. At the lower end of the upper thread, a frustroconical transition section that downwardly reduces in diameter connects to a straight fluid entry bore 303 which has a diameter equal to or slightly greater than the inner diameter of the float valve internal components 320.

The initial length of the fluid entry bore 303 is between 50 percent and 100 percent of the diameter of body 301. This length permits several recuts of the threads on the upper end of the body 301. The fluid entry bore 303 is joined to the larger main bore 302 by a transverse shoulder 305 which has a filleted intersection with the transverse shoulder. At its lower fluid outlet end 304, the body 301 has a female drill pipe thread for connection with the threaded shank 308 of a drill bit. A slightly tapered, upwardly converging short frustroconical transition connects the lower female thread with the main bore 302.

The transverse shoulder 305 forms the upper end of the main bore 303 of the body 301. The main bore 302 has a diameter which is a close slip fit to the float valve internal components 320, permitting the male O-rings of the float valve internal components to seal against the main bore. The length of the main bore 302 is such that the valve internals 320 can be fitted into the bore along with upper 310 and lower 314 damper assemblies and axial space filler rings 318, 319.

The axial space first filler ring 318 and second filler ring 319 are required to fill axial gaps between the valve internals 320 and the upper end of the drill bit shank 308 without interfering with the threaded make up of a drill bit shank into the female oilfield thread at the outlet lower end of the body 301. The depth of the internal shoulder 305 of the body 301 is initially made larger in order to provide space for recutting worn lower end threads. This initial extra length creates the need for the first 318 and second 319 filler rings. The axial length of the individual filler rings 318, 319 corresponds to the length of the body 301 removed during a thread recutting operation.

The upper damper assembly 310 consists of an upper damper retainer ring 311, an annular upper damper elastomeric element 312, and a upper damper abutment ring 313. The outer diameter of the upper damper assembly 310 is a slip fit to the main bore 302 of the body 301. The outer diameters of the rings 311 and 313 are close slip fits to the main bore 302 of the body 301. Typically, the upper and lower ends of the elastomeric element 312 are bonded respectively to the end rings 311, 313. The upper damper retainer ring 311 has a straight bore, a narrow transverse lower end, an upwardly extending external cylindrical face, a downwardly facing and outwardly extending transverse face, and a radiused shoulder connecting to a narrow transverse upper end which extends to the straight bore.

The upper damper elastomeric element 312 is an annular cylinder which has equal transverse ends. The outer cylindrical face has a reduced diameter in its central portion, while the inner cylindrical face has an increased diameter in its central portion. Multiple equispaced radial holes penetrate through the middle portions of the elastomeric element 312. The upper damper abutment ring 313 has a right circular cylindrical outer face adjoined to two relatively narrow transverse ends. The bore through the ring 313 is frustroconical and opens upwardly. The outer diameters of rings 311 and 313 and the transverse ends of the elastomeric element 312 are the same. The inner diameters of the rings 311 and 313 are less than the inner diameter of the elastomeric element 312.

The lower damper 314 is a cylindrical assembly of end support rings and an elastomeric element which is symmetric about its transverse midplane and which has a loose slip fit with the main bore 302 of the body 301. The cross-sections of the upper 312 and the lower 316 elastomeric damper elements differ, so that they exhibit different stiffness properties. Two opposed identical thin flat annular rings serve as lower damper support rings 315. The lower damper elastomeric element 316 is constructed similarly to the upper damper elastomeric element 312. The rings 315 are respectively bonded to the opposed upper and lower transverse ends of the lower damper elastomeric element 316. Different properties of the elastomeric elements 312 and 316 may be selected in order to obtain different vibration damping properties. For example, durometers, compositions, and hence stiffness properties of the elastomers of different embodiments of the elastomeric elements 312 and 316 may be selectively varied. Also, the cross-sectional profiles and elastomer properties of the elastomeric elements 312 and 316 may be varied as required for different operating conditions.

Both the upper 310 and the lower 314 dampers are required to be compressed when the valve internals 320 are retained in the body 301 by the drill bit shank 308. By supporting the valve internals between the elastomeric upper 310 and lower 315 dampers, the accelerations and resultant forces applied during drilling to the float valve internal components are reduced by energy absorption in the elastomeric elements 312 and 316. The differences in cross-sections and elastomeric properties cause the two dampers 310 and 314 to have different frequency responses and vibrational energy absorption characteristics.

Because the body 301 of a float valve is subject to severe operating conditions, its end threads are frequently recut with associated shortening of the valve body. First 318 and second 319 filler rings may be used to avoid the need to remachine the main bore 302 of the valve 300 whenever the threads at the lower end of the body 301 are recut.

The main body of each cylindrical lower filler ring 318, 319 has a length equal to the length removed during a single thread recut. The first filler ring 318 has a downwardly extending annular outer ridge on its lower transverse face which closely comates with a corresponding outer annular groove on the upper transverse face of the second filler ring 319 in order to maintain axial alignment of the rings. Both rings 318 and 319 are a close slip fit to the main bore 302 of the float valve body 301. After the first thread recut on the lower flow outlet end of the body 301, the first filler ring 318 is removed and only the second ring 319 is used. Following a second thread recut on the lower end of the float valve body, the second filler ring 319 is also removed.

With the exception of the upper 310 and lower 314 dampers, the first 318 and second 319 filler rings, and the flappers 44 of the flapper and seat assembly 34, the float valve internal components 320 are identical to those of the choke and kill manifold valve 200. The primary components include a choke and kill valve lower ball stop 221 and spring retainer 290 that differ structurally but not functionally from the corresponding components of the inside blowout preventer 10. The split retention ring 100, the interior support ring 101, and the snap ring 102 are omitted. These omitted parts are not required because the shank 308 of the drill bit serves to retain the components 320 in the valve body 301.

The float valve 300 internal components 320 also include a ball cage assembly 24, a ball assembly with internal flapper and seat assembly 34 using inside blowout preventer flappers 44, a ball 53, a main seat 62, a ball pusher assembly 70, and a latch assembly 84 with latch balls 86. Other than the flappers, these components are common to all three types of valve.

OPERATION OF THE INVENTION

The unidirectional flow control provided by the self piloted check valve works substantially the same in all configurations 10, 200, and 300 despite their being housed in a variety of bodies and minor component changes to accommodate those bodies and their service conditions. For simplicity, the description of valve operation first will treat the inside blowout preventer embodiment 10 of the self piloted check valve. For the other two versions of the valve, the differences in behavior from that exhibited by the inside blowout preventer 10 will be noted.

As seen in FIGS. 1, 2, 3, 4, and 5, the self piloted check valve 10 disclosed herein uses a ball valve 53 with a central flow passage 57 to seal against reverse flow by blocking the cylindrical axial flow path through the body 11 and, excluding the piloting flapper valve assembly 34, the assemblage of other internal parts of the valve. The flapper valve assembly 34 is pressure balanced whenever the ball is fully closed. The valve 10 prevents backflows by using a ball 53 having a through flow passage 57 which is supported in a ball cage 24 so that it simultaneously translates axially on the longitudinal axis of the valve 10 and rotates about a ball axis transverse to the longitudinal axis of the valve 10. The axis of rotation of the ball 53 is also the axis of the guide pins 55 of the ball. The ball 53 moves between a first open position with the ball bore flow path aligned with the axis of valve 10 and a second closed position with the ball bore flow path out of alignment with the valve axis and the ball sealing against its main seat 62.

Figure 5:
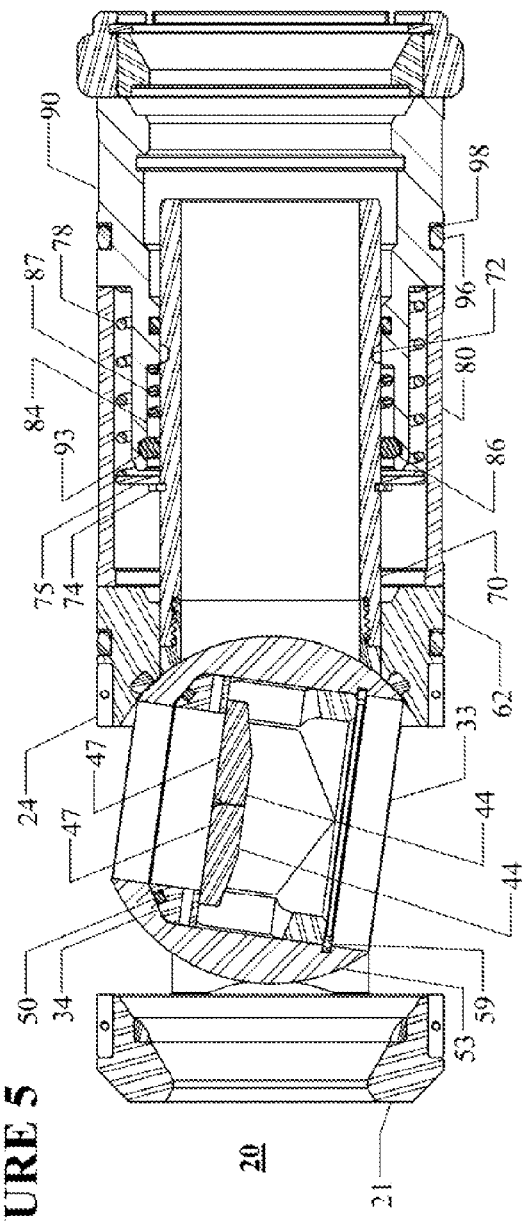
FIG. 5 is a longitudinal section corresponding to FIGS. 2, 3, and 4, but showing the ball fully seated in response to reverse flow so that reverse flow through the self piloted check valve is prevented.

The ball 53 of the improved self piloted check valve 10 has two spaced apart opposed limits to its movements along the valve axis. The lower ball stop 21, shown in FIGS. 1, 2, and 3, determines a first limit to ball 53 travel at the valve open position, while abutting the main seat 62 as seen in FIG. 5 determines a second limit to ball travel at the valve closed position. The positioning of the spherical face of the ball stop 21 and the spherical face of the main seat 62 relative to the camming pins 29 of the ball cage halves 25 determines the alignments of the ball bore 57 at the limits of its axial travel in the valve.

An analytical relationship relates rotation of ball 53 from its fully open position to the linear travel distance of the ball from its fully open position. If Θ is the rotation of the ball from its fully open position, x is the linear movement of the ball from its fully open position, y is the lateral offset of the camming pins 29 from the plane of the ball guide grooves 30 of the installed ball cage assembly 24, and $x_{MID}$ is the distance from the middle of the range of ball travel to the fully open ball position, then $$\Theta = \text{Arctangent}(x_{MID}/y) - \text{Arctangent}((x_{MID}-x)/y).$$

At the middle of the range of ball travel, the axis of the ball guide pins 57 and the axis of the camming pins 29 lie in the same plane transverse to the axis of the valve body 11.

The ball 53 is provided with a stepped cylindrical internal through flow passage bore 57 which can permit flow when the ball 53 is in its first, open position with its bore 57 aligned with the valve 10 longitudinal axis. When the ball 53 is in its second, closed position, the flow passage bore 57 of the ball 53 is out of alignment with the longitudinal axis of the valve 10 and the outer spherical surface of the ball is in sealing engagement with the molded-in elastomeric seal 64 of the valve seat 62 to block flow through the valve, as seen in FIG. 5. When the ball 53 is closed and seated, flow around the main seat 62 is blocked by both the O-ring 65 with its backup ring pair 66 and the molded-in elastomeric seal 64.

The opposed ball flats parallel to and laterally offset from the flow passage 57 of the ball 53 mount central guide pins 55 which have axes that intersect the axis of the ball through bore 57 at right angles. These ball guide pins 55 and the flats of the ball 53 coact with the ball guide grooves 30 and flat internal faces 28 of the ball cage halves 25 to maintain the ball guide pin 55 axis perpendicular to and intersecting with the longitudinal axis of the valve 10.

The two mirror image ball camming grooves 56 are cut into the face of each opposed flat of the ball 53 with one groove per side. These grooves 56 extend outwardly in the radial direction relative to the guide pins 55 on the flats of the ball 53. The axes of the opposed camming pins 29 of the stationary ball cage halves 25 are laterally offset from the ball rotational axis defined by the pins of the mounted ball. The camming pins 29 are also offset from the longitudinal axis of the valve 10 and are engaged with the camming grooves 56 of the ball 53.

When force acting along the longitudinal axis of the valve 10 is applied to the ball 53, the ball tends to translate along the valve axis. At the same time, the eccentric camming pins 29 abut the sides of the camming grooves 56 of the ball 53 to produce reaction forces on the sides of the ball grooves 56. The component parallel to the longitudinal axis of valve 10 of these reactions on the sides of the ball grooves 56 acting at a separation from the ball rotational axis, together with the force tending to move the ball 53 along the valve axis, constitute a force couple acting on the ball. This resultant force couple produces the simultaneous rotation of the ball 53 to accompany its axial movement.

A downwardly acting spring bias is used to urge the ball valve 53 to its normally open condition where it permits exiting flow through the valve 10, while separate torsional spring 46 biases are used to urge the flappers 44 of the piloting flapper valve assembly 34 to their normally closed positions. With the flapper and seat assembly 34 mounted in the counterbored annular recess in the through bore 57 of the ball 53, closure of the flappers 44 effectively prevents or strongly restricts reverse flow through the ball. The flappers 44 readily open in response to forces induced on them by exiting flows moving in the normal flow direction through the valve 10, thereby permitting minimally restricted exiting flow from the valve whenever the ball 53 is in its fully open position. the closed flappers 44 effectively convert the ball 53 into a piston which can be forced upwardly towards the main seat 62.

Figure 4:
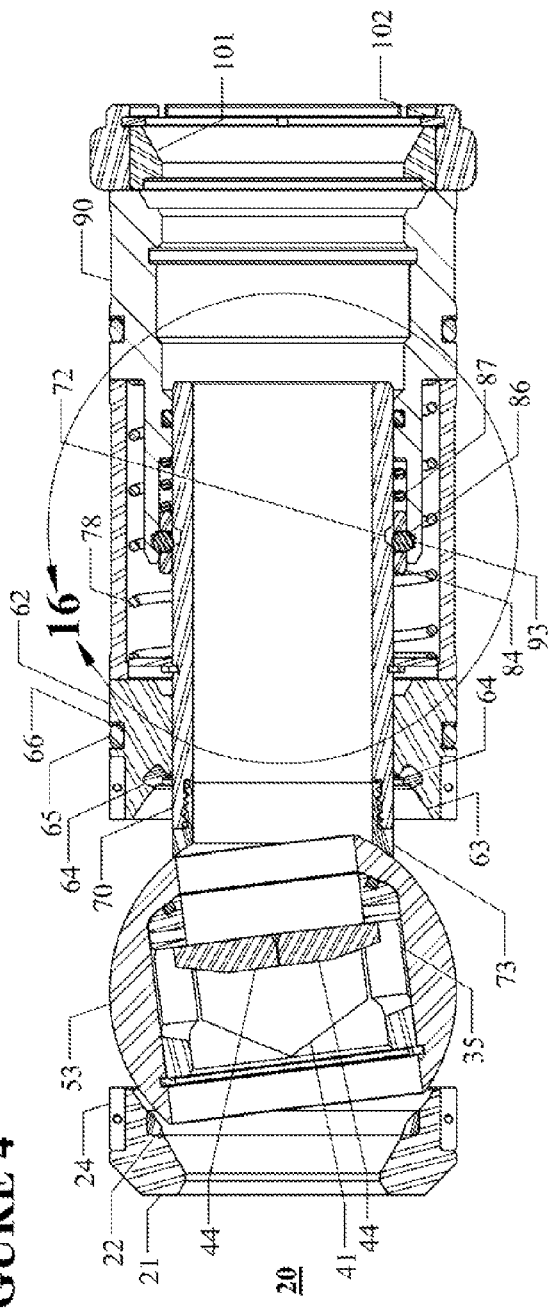
FIG. 4 is a longitudinal section corresponding to FIGS. 2 and 3, but showing the valve with the ball forced sufficiently upstream by back pressure from its position in FIG. 2 that the latch assembly with its secondary spring is nearing disengagement or reengagement from the ball pusher. The ball pusher in this case continues to apply a reduced opening spring bias force from a single spring to the upstream side of the ball.
Figure 15:
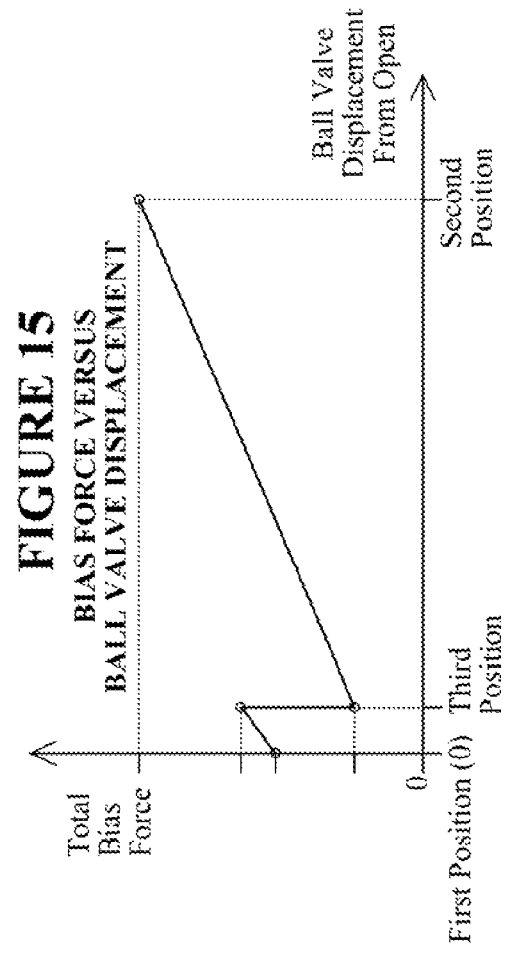
FIG. 15 is a figure illustrating the valve opening bias force versus distance relationship.

The opening spring bias for the ball valve 10 is provided by combining two separate springs 78 and 87 with different properties working in parallel. The main spring 78 is stronger at its maximum deflection than the secondary spring 87 at its respective maximum deflection, but the main spring is less stiff. The peak combined spring bias force from springs 78 and 87 applied to the ball pusher 70 and hence the ball 53 is less than the maximum force applied by the main spring 78 alone when the main spring is at its maximum deflection, as can be seen in FIG. 15. FIGS. 4 and 16 show the relative positions of the valve components when the latch sleeve 85 is nearing disengagement from the ball pusher assembly. A tubular ball pusher assembly 70 having a ball pusher seat 73 bears on the spherical surface of the ball valve 53 and transmits the forces of the opening spring biases to the ball. The biasing forces applied by the main spring 78 continuously act on the ball pusher assembly 70 through the spring washer 75 and the snap ring 74.

While the ball pusher assembly 70 is still sealing against the ball 53 as shown in FIG. 4, a slight increase in closing movement of the ball will cause that seal to be lost. The loss of seal between the ball pusher and the ball permits a "short circuit" flow both between the ball and the bore 14 of the body 10 and in the gap between the rotated ball and the ball pusher. This results in a reduction in the force urging the ball towards its closed position.

The function of the secondary spring 87 is to provide additional restraint to the vibrational axial movement of the open ball 53. When the ball is open or nearly open, the main spring 78 provides less opening biasing force to the open ball than does the secondary spring. This situation is a consequence of the required stroke length and the maximum required force required for the main spring. Additional force is desirable for resisting ball vibration when the ball 53 is resting on the ball stop 21, but having that additional force resisting final closure of the ball would frequently cause the ball to only partially close unless the backflow tendencies through the valve were undesirably high. Accordingly, the latch mechanism 84 is used to only engage the secondary spring whenever the ball is fully open or only slightly displaced from its open position against the ball stop 21.

The fluid damping action of the spring washer 75 when it is adjacent the reduced bore section of the spacer sleeve 80 greatly assists the spring biases acting on the ball to maintain the ball in a position where the ball pusher 70 remains in sealing engagement with the ball 53. This is possible because the drilling vibrations in a drillstring generally have short durations which tend to limit vibratory motion displacements, in spite of having high shock loads. When the spring washer 75 is located in the enlarged bore section of the spacer sleeve 78, its resistance to ball pusher movement is much reduced compared to when it is in the reduced bore section of the spacer sleeve.

Biasing forces from the secondary spring 87 react against the latch sleeve 85 of the latch assembly 84. The multiple small diameter latch balls 86 engaged in the radial holes through the latch sleeve 85 are not completely housed in the radial direction within those radial holes, but rather can protrude radially either outwardly or inwardly or both since their diameters are greater than the radial thickness of the latch sleeve 85. The body 71 of the ball pusher assembly 70 has a close fit to the inner diameter of the latch sleeve 85 of the latch assembly 84, while the secondary spring recess 92 of the spring retainer 90 has a close fit to the outer diameter of the latch sleeve 85.

The male annular latch groove 72 of the ball pusher assembly 70 has a radial depth sufficient to permit the radially inwardly urged balls 86 of the latch assembly 84 to not extend radially outwardly of the outer diameter of the latch sleeve 85 when the holes in the latch sleeve groove 72 are adjacent the ball pusher latch groove 72. Likewise, the radial depth of the female annular groove 93 of the spring retainer 90 is sufficient to allow the latch balls 86 engaged in the latch sleeve 85 to extend radially inwardly no farther than the inner diameter of the latch sleeve 85 when the spring retainer latch groove 93 is adjacent the holes of the latch sleeve. When the annular latch groove 72 of the ball pusher body 71 is in close proximity to the annular latch groove 93 of the spring retainer 90, the latch balls 86 can be partially engaged in both grooves.

Figure 3:
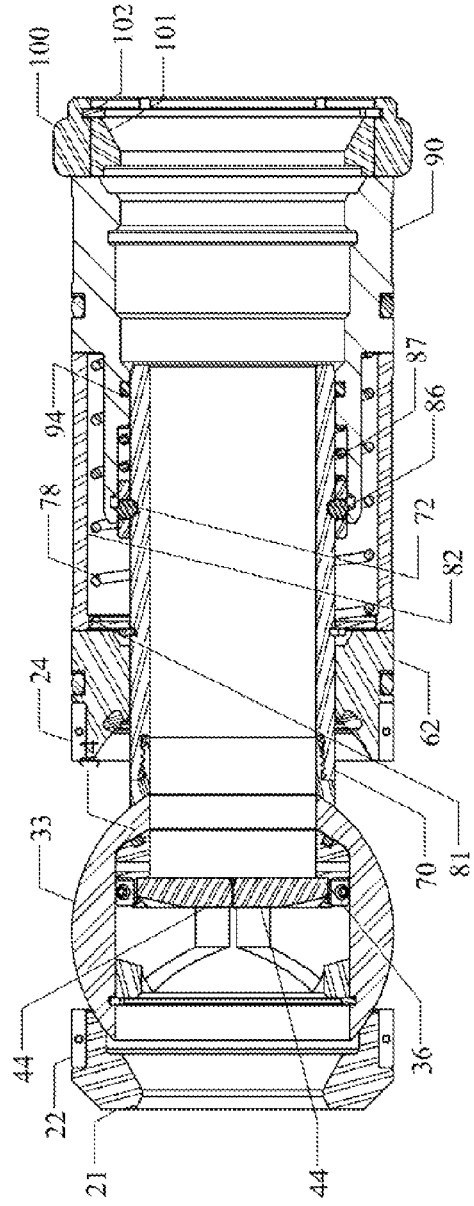
FIG. 3 shows a longitudinal sectional view corresponding to FIG. 2, but with the piloting flapper valve closed and the ball open. This view shows the valve in its normal position when flow has ceased, but there is no back pressure. In this position, the ball is still biased open by the action of two coacting, separate springs.

Whenever the latch balls 86 are engaged in the both the latch sleeve 85 and the annular latch groove 72 of the ball pusher 70 and held there by the radial reaction of the balls against the cylindrical surface of the secondary spring recess 92 of the spring retainer 90, the application of axial forces on the ball pusher acting through its lower inclined face of the latch groove 72 urges the balls radially outwardly. This situation is shown in FIGS. 1, 2, and 3.

Likewise, whenever the latch balls 86 are engaged in the both the latch sleeve 85 and the annular latch groove 93 of the spring retainer 90, the balls are held there by the radial reaction of the balls against the outer diameter of the ball pusher body 71. At that time, the application of axial forces from the secondary spring 87 on the latch sleeve urges the latch balls radially inwardly due to reactive forces applied to the balls from the lower inclined face of the latch groove 93 of the spring retainer 90. This situation is shown in FIG. 5. The radial forces urging radial movement of the balls 86 result from the interaction of the balls with the frustroconical ends of the grooves 72, 93 whenever loadings in the axial direction of the valves 10, 200, and 300 are applied to the balls.

Thus the balls 86 shift outwardly when they reach the annular latch groove 93 of the spring retainer 90 when the main spring 78 is sufficiently compressed during the closure of the ball 53. Likewise, the balls 86 shift inwardly when they reach the annular latch groove 72 of the ball pusher body 71 when the main spring 78 is sufficiently decompressed during the opening of the ball 53.

FIG. 4 and the detail view FIG. 16 show the balls 86 when they are almost fully shifted into full engagement with the spring retainer latch groove 93 as the ball 53 nears its third position during its closure. When the balls 86 move close enough to the annular latch groove 93 in this situation, they will fully shift out of engagement with the groove 72 of the ball pusher assembly 70 and into full engagement with the groove 93. The ball pusher 70 is then fully decoupled from the latch assembly 84, as shown in FIG. 5.

Further upward movement of the ball pusher 70 as the main ball 53 moves upwardly past its third position then causes the balls 86 to be trapped in their outward position in groove 93 by contact with the outer cylindrical wall of the ball pusher 70. When this condition exists, the ball pusher assembly 70 only transmits downward main ball opening bias forces from the main spring 78 to the main ball 53. Neglecting frictional effects, any biasing forces from the secondary spring 87 do not act on the main ball 53 for this situation, since the downward bias force from the secondary spring 87 bearing on the latch sleeve 85 of the latch assembly 84 is fully decoupled from the ball pusher 70 and transmitted only to the spring retainer 90.

When the ball pusher assembly 70, biased by only the main spring 78 acting on the spring washer 75 and snap ring 74, is moving downwardly as the main ball 53 moves from its second position towards its third position, the spring bias from the secondary spring 87 urges the latch balls 86 inwardly so that they will begin to shift into engagement with the latch groove 72 of the of the ball pusher assembly 70 when that groove comes sufficiently near. FIGS. 4 and 16 also illustrate the situation when the balls 86 are in the process of disengaging from the female latch groove 93 of the spring retainer 90 and reengaging with the male latch groove 72 of the ball pusher. When the balls 86 move close enough to the annular latch groove 72 in this situation, they will fully shift out of engagement with the groove 93 of the spring retainer 90 and into full engagement with the ball pusher groove 72. The ball pusher 70 is then fully recoupled to the latch sleeve 85 and the bias force from the secondary spring 87 again contributes to the downward urging of the ball pusher and hence also to the ball 53.

As a consequence of this unlatching and relatching action of the secondary spring 87 biased latch assembly 84, the ball 53 is strongly biased against the ball stop 21 by both main spring 78 and secondary spring 87 during zero flow or normal downward flow through the valve 10. However, whenever the ball 53 is moved towards its main seat 62 more than a short distance, decoupling of the latch assembly 84 from the ball pusher assembly 70 reduces the opening bias forces on the ball to only those provided by the main spring 78. The resulting higher spring forces biasing the open ball 53 against the ball stop 21, compared to those obtained by using the main spring 78 alone, greatly aid in minimizing vibratory relative motion in the axial direction between the ball and the ball cage 24.

Additional resistance to vibratory motion of the ball 53 is provided by fluid damping. The close fit of the spring washer 75 to both the lower portion of the spacer sleeve 80 and the ball pusher body 71 results in sufficient flow restriction in the annular gap between the two parts 75 and 80 to provide additional resistance to vibratory motion of the ball pusher assembly 70 and hence the ball 53. As a consequence, a further reduction to vibration induced wear tendencies from axial motion of the ball 53 is provided by the resultant fluid damping. This fluid damping results from the pressure drop in the gap between the moving spring washer 75 and the adjacent bore of the spacer sleeve 80. The pressure differential acts on the spring washer 75 to resist its motion. However, the enlargement of the upper bore 82 of the spacer sleeve 80 appreciably lessens the fluid damping of the spring washer 75 except when it is near its position bearing on the open ball 53.

The limiting of the effective fluid damping of ball motion to only the region between the first and third positions of the ball 53 is necessary in order to ensure that the ball pusher assembly 70 rapidly moves downwardly to prevent extraneous flow between the spherical surface of the ball and the bore of the body 11. This downward movement of the ball pusher assembly occurs with only the force of the main spring 78 and the weight of the ball pusher.

When both the main spring 78 and the secondary spring 87 are active in biasing the ball 53 towards its open position, a relatively high force is available to urge the ball 53 against the lower ball stop 21. When the latch assembly 84 is released from the ball pusher assembly 70, the resistance to ball closure drops. However, further upward travel of the ball towards its closed position leads to the maximum opening bias force being applied to the ball when the ball is fully closed, rather than when both the main and secondary springs are urging the ball to its open position. This maximum force is not so excessive that very high values of backflow are required for full ball closure. The relatively high initial force resisting ball movement away from its open position is highly desirable to minimize ball vibratory motions while at the same time keeping the maximum force required for closure to reasonable levels.

When pumping through valve in its normal direction resumes, the relatively large area and low mass of the ball 53 cause it to move to its open position more rapidly than the ball pusher assembly 70. This results in some flow passing between the ball pusher and the ball. Small amounts of such flow are desirable for flushing the sealing surfaces of the ball and the main seat 62. However, provision of the fluid damping makes it desirable to strongly urge the ball pusher assembly 70 to follow the opening ball 53 in order to limit wear. For this reason, the upper bore of the spacer sleeve 80 is enlarged so that the ball pusher assembly can more rapidly move downwardly and recontact the spherical surface of the ball 53.

Fluid induced forces also act on the ball 53 and the flappers 44. The flapper and seat assembly 34 is fixedly mounted in the ball 53 with O-ring 50 sealing between the ball bore 57 and the flapper seat ring 35. The springs 46 urge the flappers 44 to their normally closed position but are easily overcome by minor flows from the inlet end of the valve 10. However, when there are no or reverse flow conditions for the valve, the flappers 44 are firmly biased against their seating surface 36 by their flapper springs 46. When the flappers 44 are seated against the seating surface 36 of the flapper seat ring 35, the combination of the ball 53 and the flappers 44 functions like a piston for reverse flow.

Of necessity, operating clearances have to exist between adjacent flappers when multiple flappers 44 are used. The use of multiple flappers to close the flow passage for the valve 10 permits a reduction in ball 53 size and hence body 11 size when compared to the case for use of a single flapper. For a valve newly in service, the resultant clearance gaps between the adjacent flapper edges 45 of the closed flappers result in some trivial flow past the closed flappers when reverse flow conditions exist. By eliminating vortex formation on the downstream side of the open flappers, the close fit of the flapper shroud 40 to the first planar flapper faces which when closed are adjacent corresponding faces prevents fluid erosive wear of those faces. Also, the near alignment of the large flat planar sealing faces of the open flappers 44 with the flow through the ball strongly minimizes fluid erosive wear on those faces. Provision of the rubber rings on the flapper pivot pins 48 effectively damps flow induced flapper oscillatory motions in the plane of the flappers that could otherwise result in flapper pin wear and consequent flapper misalignment and mutual interference when closing.

Thus, the gaps between adjacent flappers and between the flappers and their seat ring 35 cannot grow appreciably over time in abrasive flow conditions. Accordingly, the amount of reverse flow allowed by the flappers 44 in any case is minor and flapper wear will require only a negligible increase in reverse flow from that required for the unworn full flapper closure condition to produce sufficient force to bias the ball 53 to full closure against its seat 62.

Whenever the ball 53 moves a short distance away from its fully open condition abutted against the ball stop 21, the ball pusher seat 73 initially remains in sealing contact with the ball. However, additional ball rotation beyond a geometrically determined limit will break the seal between the ball and ball pusher seat 73. When that happens, an extraneous flow path is created through the clearance gap both between the ball 53 and main bore 14 of the body 11 and also between the ball pusher seat 73 and the ball 53. This extraneous flow path necessitates sufficient reverse flow induced on the ball assembly to overcome the spring biasing forces acting to attempt to hold the ball open. Normally, the increased flow in this case is minor due to the restriction on this flow by the minimal clearance gap between the ball 53 and the main bore 14 of the body.

The outer and inner diameters of the ball pusher seat 73 are selected to ensure that, during ball 53 closing travel towards its main seat 62, the latch assembly 84 releases the ball pusher assembly 70 at or just prior to loss of sealing contact between the ball pusher seat and the ball. FIG. 4 shows the ball 53 translated and rotated sufficiently in the closing direction from the lower ball stop 21 that the ball pusher seat 73 has only marginal sealing with the ball 53. However, the amount of upward travel seen in FIG. 4 of the ball 53 from the ball stop 21 is sufficient in this condition to have already decoupled the latch assembly 84 from the ball pusher 70, thereby removing the ball opening bias force of the secondary spring 87 from the ball. This same amount of travel causes the spring washer 75 to move past the reduced diameter bore portion of the spacer sleeve 80, thereby reducing the fluid resistance to motion of the spring washer, the ball pusher assembly 70, and the ball 53.

FIG. 15 illustrates the variation in the opening bias force on the ball 53 as a function of the displacement of the ball from its fully open first position resting against the ball stop 21. The effects of hydraulic damping resisting ball closing motion are not included in FIG. 15. A relatively high force produced by reverse flow in the valve 10 is required to initiate valve movement sufficiently away from the ball stop 21 to decouple the biasing forces of the secondary spring 87 from biasing the ball towards its open position. However, once the bias of the secondary spring 87 is removed by displacing the ball towards the second closed position past its third position, the fluid induced closure forces needed to produce full ball closure against the main seat 62 at the second ball position are reduced for much of the middle portion of ball displacement from the open position. When the ball 53 is fully closed against the main seat 62, the flappers 44 are pressure balanced. In any case, the reverse flow induced forces needed to fully close the valve 10 can be provided with relatively low flows.

When normal flow from the inlet end of the valve 10 initiates with the valve in its closed second position, the flow induced pressure on the ball 53 and the spring bias force from the main spring 78 urge the ball towards its normally open condition against the ball stop 21. The opening bias force on the ball 53 from the main spring 78 is always active whenever the ball pusher 70 bears on the ball 53, and the reengagement of the latch balls 86 of the latch assembly 84 with the ball pusher 70 results in the additional opening bias force of the secondary spring 87 contributing to maintaining full opening of the ball.

The tight closure of the flappers during flow stoppage with the upper end of the drillstring unvented does not interfere with pressure balancing across the ball, since pressure from below can unseat the ball from its lower ball stop sufficiently that a temporary small volume pressure balancing flow can cause the ball too move sufficiently upwardly that the ball pusher will temporarily lose sealing contact with the ball. When the pressures across the ball are substantially equalized, the upward pressure force on the ball is sufficiently reduced to permit the ball to return to its fully open position. When the drillstring is opened to the atmosphere at its upper end, U-tubing tendencies in the drillstring normally will cause the valve 10 to totally close.

The choke and kill manifold check valve 200 has deliberately enlarged clearances between adjacent faces of its individual flappers 244. The resulting increased flow leakage area in the choke and kill flapper assembly cause the valve 200 to act as a hydraulic fuse. While this behavior occurs to some extent for each of the valve assemblies 10, 200, and 300, it is deliberately enhanced for this application.

Thus, the valve 200 will close only when the backflow through the flappers 244 exceeds a predetermined level. As a consequence of this increased flapper leakage flow area, the choke and kill manifold check valve will not close during the relatively low displacement backflows associated with normal wireline or coiled operations. However, if the well loses stability during such operations so that some level of additional backflow tends to come from the well, the valve 200 will shut to isolate the well when the backflow is sufficient. The sizing of the gaps between flappers can be calculated to adjust the closing backflow value.

The conventional approach to wireline or coiled tubing operations in a well is to remove the internal components from a conventional poppet type choke and kill manifold check valve. This action removes necessary blowout protection during operations which can inadvertently start a well to flow uncontrollably. Thus use of the choke and kill manifold check valve 200 provides necessary enhanced safety to wireline and coiled tubing operations in live wells.

The float valve version 300 of the check valve is functionally identical to the inside blowout preventer version 10 of the valve, with the exception of the vibration damping provided by the elastomeric upper 310 and lower 314 damper assemblies. The dampers are necessary because of the extremely high vibration levels in a drillstring near the bit where the float valve is placed. These dampers act to reduce axial vibratory movement of the valve internals and the resultant wear.

The cross-sections of the upper 312 and lower 316 damper elastomeric elements differ, and their elastomer compositions may also be different. Consequently, their axial stiffness differ. Additionally, the axial stiffness of these elastomeric elements also change as a function of their amount of axial compression, due to geometry changes during compression. The consequence of these effects is that the elastomeric elements 312 and 316 have different frequency responses and hence damp different portions of the vibration amplitude spectrum. Since both dampers 310 and 314 are installed in compression, both are generally active at the same time. The amount of damping and its frequency dependence can be adjusted by providing different elastomer properties and geometries.

When the float valve 300 is closed, sufficient upward axial pressure load acting on the closed valve internals will cause the upper elastomeric damper element 312 to be so strongly compressed that the upper damper retainer ring 311 and the upper damper abutment ring 313 will come in contact to support the axial load. This abutment of the rings 311 and 313 prevents the upper elastomeric element 312 from overstressing while the pressure load is transferred into the body 301 of the float valve.

ADVANTAGES OF THE INVENTION

The embodiments of the self-piloted check valve described herein offer numerous benefits compared to conventional check valves. Because of its full opening construction, the valve has very low pressure losses, even with unusually high flow rates. The full opening construction also permits the unimpeded passage of objects through the bore of the valve when normal flow is occurring. This feature is useful in some service conditions. The low flow restriction is a result of minimal flow turbulence due to the straight flow path through the valve, which leads to a consequent reduced tendency for wear from abrasive flows.

While the piloting flappers are always susceptible to abrasive and other types of fluid erosion, they do not have to fully seal when closed to pilot the valve. With the ball closed against its seat, the flappers are pressure balanced and inactive in preventing reverse flow. Only engagement of the ball and its seat prevent reverse flow. As the flappers wear, the reverse flow necessary to obtain ball valve closure increases slightly, but the valve still functions.

The primary reason for the long life of the improved self-piloted check valve is the protection of both the spherical sealing surface of the ball and its seat from all flow except the low flows passing the ball and its seat during bidirectional shifting of the valve between its open and closed positions. These low bypass flows are sufficiently slow to not present an erosion problem to the sealing surfaces of the ball and seat.

When the improved self piloted check valve is used as either an inside blowout preventer or a float valve in a drillstring, it is desirable that whenever the flow through the valve is stopped prior to closure of the ball, the pressures on both sides of the ball are equalized prior to opening the drillstring at its upper end. This permits determining the pressure in the formation being drilled. With the flappers closed, higher pressure below the valve on its downstream side causes the ball to move sufficiently far off its seat that communication past the ball is possible. The resultant very low flow communication passes between the ball and its seat and also between the ball and the ball pusher when the ball is partially rotated and translated off its seat, thereby permitting the pressures on both sides of the valve to be equalized. Following pressure equalization, the ball moves back to its normally open position under urging from the spring biases. Subsequent opening of the drillstring at its upper end then will typically cause a sufficient pressure differential across the closed ball and flappers that the ball will fully close. This capability of pressure measurement through the improved self piloted check valve is critical for safety in drilling applications.

Likewise, permitting some limited reverse flow through the open ball and closed but deliberately leaky valve flappers shown in FIG. 12 for the choke and kill manifold check valve is essential to allowing necessary fluid displacements from wireline or coiled tubing operations through the valve while still having reliable closure for undesirably large reverse flows.

Provision of a two stage ball opening bias, such as that indicated in FIG. 15, is important for avoiding excessive ball motion whenever the valve is strongly vibrated, such as is the case for drilling float valves. If the contacts between the ball and its ball cage are subject to excessive vibration, such as can occur in near bit drilling applications of the float valve version of the valve, then the provision of the initially higher opening bias on the ball due to use of the secondary spring can substantially limit wear on the ball and its ball cage. Such wear can lead to sufficient loss of alignment that the ball would fail to seal properly when moved to its closed position. Additionally, the high fluid damping of the ball pusher movement when the ball is near the ball stop also aids in minimizing ball vibration.

Having to overcome a higher initial ball opening spring bias is also desirable to ensure the development of sufficient force from reverse flow to ensure complete displacement of the ball from its open position towards its sealing position abutting its seat. This is particularly advantageous when the valve is to be used in film forming fluids, such as crude oils with high paraffin contents. Also, isolating the exterior of the open ball from film forming fluids due to sealing of the ball pusher seat with the ball when the valve is open further minimizes the tendencies for the valve to stick partially open or closed due to film buildup. These and other advantages will be apparent to those skilled in the art.

The space between the main seat of the valve and the spring retainer is essentially isolated by the O-ring of the spring retainer. This permits the spring washer to provide damping for upward movement of the ball pusher and ball. As a result, component wear is reduced by this feature. Engaging the spring washer on both sides by snap rings can permit bidirectional damping. Bidirectional damping of ball motion is important to reduce wear in high vibration situations such as those encountered by float valves.

Various changes can be made to the construction of the self piloted check valve described above without departing from the spirit of the invention. Different materials can be used for reasons of corrosion or temperature resistance. Different spring types can also be substituted for the coil springs, such as the use of a wave spring instead of the coil spring used for the secondary bias spring. A metal-to-metal seat can be substituted for the elastomeric ball seat seal. Minor changes can render the valve fire safe. These and other changes do not depart from the spirit of the invention.

What is claimed is:

1. A valve apparatus comprising:
    (a) a tubular body having a main counterbore; and
    (b) a plurality of internal valving components housed within the main counterbore, wherein the internal valving components have a first end and a second end transverse to the main counterbore, the internal valving components including:
        (i) a ball seat having a seat flow passage;
        (ii) a ball valve having a valve flow passage, wherein the ball valve is movable with simultaneous directly related rotation and translation to a first ball position with the valve flow passage in axial alignment with the main counterbore of the tubular body, a second ball position abutting the ball seat wherein the valve flow passage is not in fluid communication with the seat flow passage such that the main counterbore of the tubular body and the flow passage are closed, and a third ball position intermediate between the first and second ball positions;
(iii) a pilot valve mounted within the valve flow passage, the pilot valve comprising a plurality of flappers, wherein each flapper is mounted on an individual flapper pivot pin having multiple elastomeric rings on an outer surface of the pivot pin to provide vibrational energy absorption and wherein each flapper is rotatable between a closed position and an open position and wherein each flapper has a flapper bias spring that biases the flapper toward the closed position;
(iv) a spring biasing system for providing a bias on the ball valve, the spring biasing system including a first spring and a second spring, wherein the first spring provides a continuous bias on the ball valve to urge the ball valve towards the first ball position and wherein the second spring is activated to bias the ball valve towards the first ball position only when the ball valve is at the first ball position or when the ball valve is moving between the first ball position and the third ball position; and
(v) a motion damping device that increases a dampening of a vibratory motion on the ball between the first ball position and the third ball position.

2. The valve apparatus of claim 1, wherein a maximum combined bias force applied by the first spring and the second spring as the ball valve is moving between the first ball position and the third ball position is less than a maximum bias force applied by the first spring when the first spring is maximally deflected when the ball valve is in the second ball position.

3. The valve apparatus of claim 1, wherein when the flappers are in the closed position the flappers are separated by a predetermined gap.

4. The valve apparatus of claim 1, wherein the first transverse end of the internal valving components abuts a first damper having a first elastomeric element and the second transverse end of the internal valving components abuts a second damper having a second elastomeric element, wherein the first elastomeric element has different vibrational energy absorption characteristics from the second elastomeric element.

5. The valve apparatus of claim 1, wherein the spring bias mechanism includes an axially reciprocable latching system.

6. The valve apparatus of claim 1, wherein the spring bias mechanism further comprises:
(a) a ball pusher seat having a ball side and an opposed side, wherein the ball side bears against a first side of the ball valve;
(b) a tubular ball pusher mounted on the opposed side of the ball pusher seat, wherein an internal diameter of the ball pusher equals the diameter of the flow passage of the ball valve;
(c) a spring retainer, wherein a portion of the spring retainer encircles a portion of the ball pusher; and
(d) a latching mechanism, wherein the latching mechanism is latched to the ball pusher when the ball valve is in the first ball position, unlatches from the ball pusher as the ball valve goes from the first ball position to the second ball position, and is latched to the spring retainer when the ball valve is in the second ball position.

7. The valve apparatus of claim 6, further comprising a spring washer fitted between an external surface of the ball pusher and a spacer sleeve, wherein the spacer sleeve has a bore having a section that provides a close fit to an outer diameter of the spring washer whereby when the ball is between its first and third positions, the spring washer increases a dampening of an axial vibratory motion of the ball pusher.

8. The valve apparatus of claim 1, further comprising a ball cage stationarily positioned in the main counterbore of the tubular body, wherein the ball valve is eccentrically engaged with the ball cage by a pair of opposed eccentric pins mounted on the ball cage.

9. The valve apparatus of claim 1, wherein when the ball is in the second ball position a spherical surface of the ball sealingly abuts a compatible spherical surface of the ball seat and fluid flow past the valve seat is prevented.

10. The valve apparatus of claim 1, wherein when the ball is in its first position a fluid flowing from the first end of the internal valving components toward the second end of the internal valving components with sufficient force to overcome the bias of the flapper bias springs rotates the flappers to the open position thereby allowing fluid flow through the ball valve flow passage.

11. The valve apparatus of claim 1, wherein whenever a fluid flowing from the second end of the internal valving components toward the first end of the internal valving components exerts sufficient force against the flappers in their closed position and the ball to overcome the bias of the first and second springs, the ball valve moves to the second ball position.

12. The valve apparatus of claim 1, wherein a ball stop delimits a movement of the ball valve when moving to the first ball position.

13. The valve apparatus comprising:
(a) a tubular body having a main counterbore; and
(b) a plurality of internal valving components housed within the main counterbore, wherein the internal valving components have a first end and a second end transverse to the main counterbore, the internal valving compontents including:
(i) a ball seat having a seat flow passage;
(ii) a ball value having a value flow passage, wherein the ball valve is moveable with simultaneous directly related rotation and translation to a first ball position with the valve flow passage in axial alignment with the main counterbore of the tubular body, a second ball position abutting the ball seat wherein the valve flow passage is not in fluid communication with the seat flow passage such that the main counterbore of the tubular body and the flow passage are closed, and a third ball position intermediate between the first and second ball positions;
(iii) a pilot valve mounted within the valve flow passage, the pilot valve comprising a plurality of flappers, wherein each flapper is mounted on an individual flapper pivot pin and wherein each flapper is rotatable between a closed position and an open position and wherein each flapper has a flapper bias spring that biases the flapper toward the closed position;
(iv) a shroud that protects downstream edges of the open flappers;
(v) a spring biasing system for providing a bias on the ball valve, the spring biasing system including a first spring and a second spring, wherein the first spring provides a continuous bias on the ball valve to urge the ball valve towards the first ball position and wherein the second spring is activated to bias the ball valve towards the first ball position only when the ball valve is at the first ball position or when the ball valve is moving between ther first ball position and the third ball position; and (vi) a motion damping device that increases a dampening of a vibratory motion on the ball between the first ball position and the third ball position.

14. A valve apparatus comprising:
(a) a tubular body having a main counterbore; and
(b) a plurality of internal valving components housed within the main counterbore, wherein the internal valving components have a first end and a second end transverse to the main counterbore, the internal valving components including:
(i) a ball seat having a seat flow passage;
(ii) a ball valve having a valve flow passage, wherein the ball valve is movable with simultaneous directly related rotation about an axis of rotation and translation to a first ball position with the valve flow passage in axial alignment with the main counterbore of the tubular body and a second ball position abutting the ball seat wherein the valve flow passage is not in fluid communication with the seat flow passage such that the main counterbore of the tubular body and the valve flow passage are closed thereby preventing flow through the valve apparatus;
(iii) a spring biasing system for providing a bias on the ball valve, the spring biasing system including a reciprocable latching system, a first spring and a second spring, wherein the first spring provides a continuous bias on the ball valve to urge the ball valve towards the first ball position and wherein the second spring is activated to bias the ball valve toward the first ball position only when the ball valve is at the first ball position or moving between the first ball position and a third ball position; and
(iv) a pilot valve mounted within the valve flow passage, the pilot valve comprising a plurality of flappers wherein each flapper is rotatable between a closed position and an open position and wherein each flapper has a flapper bias spring that biases the flapper toward the closed position and wherein the pilot value includes a shroud having a recess fir each flapper, wherein a downstream edge of each flapper in the open position fits within one recess thereby protecting the downstream edge and minimizing flutter induced vortices;
whereby a fluid flowing in a first direction from the first end of the internal valving components toward the second end of the internal valving components with sufficient force to overcome the bias of the flapper bias springs rotates the flappers to the open position allowing fluid flow through the valve flow passage and wherein the fluid flowing in a second direction from the second end of the internal valving components toward the first end of the internal valving components with sufficient force against the flappers in the closed position to overcome the bias of the first and second springs will rotate the ball valve to the second ball position.

15. The valve apparatus of claim 14, wherein the first transverse end of the internal valving components abuts a first damper having a first elastomeric element and the second transverse end of the internal valving components abuts a second damper having a second elastomeric element and wherein the second elastomeric element has different vibrational energy absorption characteristics than the first elastomeric element.

16. The valve apparatus of claim 14, wherein the reciprocable latching system includes:

(a) a ball pusher seat having a ball side and an opposed side, wherein the ball side bears against a first side of the ball valve;
(b) a tubular ball pusher mounted on the opposed side of the ball pusher seat, wherein an internal diameter of the ball pusher equals the diameter of the valve flow passage; and
(c) a spring retainer, wherein a portion of the spring retainer encircles a portion of the ball pusher;
whereby the latching system is coupled to the ball pusher when the ball valve is in the first ball position and coupled to the spring retainer when the ball valve is in the second ball position, and
whereby the latching system uncouples at a third ball position in a movement of the ball valve from the first ball position to the second ball position and recouples at the third ball position, wherein the third ball position is between the second ball position and the first ball position.

17. The valve apparatus of claim 14, wherein
(a) the ball seat and a spring retainer are spaced apart by a tubular spacer sleeve having a first cylindrical bore that abuts the ball seat on a first end of the spacer sleeve and adjoins a second cylindrical counterbore that extends to a second end of the spacer sleeve, wherein a length of the first cylindrical bore is equal to a distance between the first position and the third position of the ball; and
(b) a ball pusher has an intermediate external groove containing a snap ring and an annular damper washer bearing on the snap ring on a first side and bearing on the first spring on a second side, wherein the damper washer is a close fit to the first cylindrical bore of the tubular spacer sleeve.

18. The valve apparatus of claim 14, wherein when the ball is in the second ball position a spherical surface of the ball sealingly abuts a compatible spherical surface of the ball seat and a fluid flow past the ball seat is prevented.

19. The valve apparatus of claim 14, wherein each flapper is separated from another flapper by a predetermined gap, the predetermined gap calculated to require a desired fluid pressure force in the second direction to rotate the ball valve to the second ball position.

20. The valve apparatus of claim 14, wherein a maximum combined bias force applied by the first spring and the second spring as the ball valve is moving between the first ball position and the third ball position is less than the maximum bias force applied by the first spring when the first spring is maximally deflected when the ball valve is in the second ball position.

21. A valve apparatus comprising:
(a) a tubular body having a main counterbore; and
(b) a plurality of internal valving components housed within the main counterbore, wherein the internal valving components have a first end and a second end transverse to the main counterbore, the internal valving components including:
(i) a ball valve having a flow passage, wherein the ball valve is movable with simultaneous directly related rotation about an axis of rotation and translation to a first ball position with the flow passage in axial alignment with the main counterbore of the tubular body and to a second ball position such that the main counterbore of the tubular body and the valve flow passage are closed to fluid flow;
(ii) a ball seat having a seat flow passage, wherein when the ball valve is in the second ball position a spherical surface of the ball valve sealingly abuts a compatible spherical surface of the ball seat such that a fluid flow past the ball seat is prevented and the ball flow passage is not in fluid communication with the ball seat flow passage;

(iii) a ball cage that supports the ball valve, wherein the ball cage is stationarily positioned in the main counterbore of the tubular body and eccentrically engages the ball valve eccentric to a ball valve axis of rotation through a pair of opposed eccentric pins mounted on the ball cage;

(iv) a spring biasing system for providing a bias on the ball valve, the spring biasing system comprising:

a ball pusher seat having a ball side and an opposed side, wherein the ball side bears against a first side of the ball valve;

a tubular ball pusher mounted on the opposed side of the ball pusher seat, wherein an internal diameter of the ball pusher equals the diameter of the flow passage of the ball valve;

a spring retainer, wherein a portion of the spring retainer encircles a portion of the ball pusher;

a first spring;

a second spring; and a reciprocable latching mechanism, wherein the latching mechanism is coupled to the ball pusher when the ball valve is in the first ball position, the latching mechanism uncouples at an intermediate point when the ball valve is moving from the first ball position to the second ball position and recouples at the intermediate point when the ball valve is moving between the second ball position and the first ball position, and the latching mechanism is coupled to the spring retainer when the ball valve is in the second ball position; and (v) a pilot valve mounted within the ball valve flow passage, the pilot valve comprising a plurality of flappers, each flapper rotatable between a closed position and an open position, wherein a flapper bias spring biases each flapper toward the closed position and wherein the pilot value includes a shroud having a recess for each flapper, wherein a downstream edge of each flapper in the open position fits within one recess therby protecting the downstream edge and minimizing flutter induced vortices;

whereby a fluid flowing in a first direction from the first end of the internal valving components toward the second end of the internal valving components with sufficient force to overcome the bias of the flapper bias springs rotates the flappers to the open position allowing fluid flow through the ball valve flow passage and wherein the fluid flowing in a second direction from the second end of the internal valving components toward the first end of the internal valving components with sufficient force against the flappers in the closed position to overcome the bias of the first and second springs will cause the ball valve to rotate to the second ball position.

* * * * *